United States Patent
Saeed

(10) Patent No.: US 10,216,412 B2
(45) Date of Patent: Feb. 26, 2019

(54) DATA PROCESSING SYSTEMS

(71) Applicant: ARM Limited, Cambridge (GB)

(72) Inventor: Sharjeel Saeed, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 15/432,769

(22) Filed: Feb. 14, 2017

(65) Prior Publication Data

US 2018/0232148 A1 Aug. 16, 2018

(51) Int. Cl.
*G06F 13/00* (2006.01)
*G06F 3/06* (2006.01)

(52) U.S. Cl.
CPC ............ *G06F 3/0604* (2013.01); *G06F 3/064* (2013.01); *G06F 3/0656* (2013.01); *G06F 3/0673* (2013.01)

(58) Field of Classification Search
None
See application file for complete search history.

(56) References Cited

U.S. PATENT DOCUMENTS

2005/0012752 A1* 1/2005 Karlov .................. G06T 1/60
                                                          345/538
2013/0034309 A1    2/2013 Nystad

FOREIGN PATENT DOCUMENTS

GB          2543736 A       5/2017

\* cited by examiner

*Primary Examiner* — Adam M Queler
*Assistant Examiner* — Trang K Ta
(74) *Attorney, Agent, or Firm* — Vierra Magen Marcus LLP

(57) ABSTRACT

Operating a data processing system including producing data in the form of plural blocks of data, where each block of data represents a particular region of an output data array, storing the data in a memory of the data processing system, and reading the data from the memory in the form of lines. Storing the data in the memory comprises storing each block of data of a first row of blocks of data in the memory at one or more memory addresses of a first set of memory addresses of a sequence of memory addresses for the memory, and storing each block of data of a second row of blocks of data in the memory at one or more memory addresses of a second set of different memory addresses of the sequence of memory addresses for the memory.

19 Claims, 9 Drawing Sheets

DATA PROCESSING SYSTEMS

BACKGROUND

The technology described herein relates to data processing systems, and in particular to the processing of data when generating an image for display on a display in a data processing system.

In data processing systems, it can often be the case that data is generated or otherwise provided in a format that is different to a format that is subsequently required. This may be the case, for example, when processing an image for display. In this case, data in respect of an image to be displayed may be generated in the form of plural two-dimensional blocks (arrays) of data positions (e.g. "tiles"), but may be further processed and/or provided to a display (such as a display panel) in the form of plural one-dimensional lines of data positions (e.g. raster lines).

One exemplary such arrangement is in a display controller, where input blocks (arrays) of data may be used (consumed) in the form of raster lines (e.g. when generating output frames for display on a display).

In such arrangements, the data processing system must effectively convert from one format to the other. This can be achieved using a so-called "de-tiler", where the data is written in the form of plural blocks of data to a buffer, and is then read out from the buffer in the form of lines of data.

The Applicants believe that there remains scope for improvements to data processing systems that operate in this manner.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
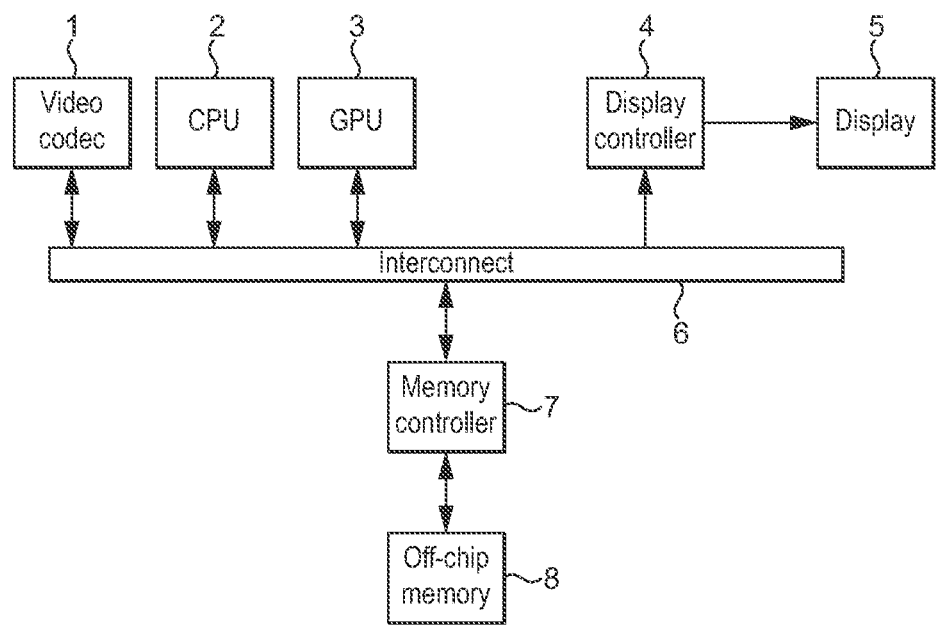
FIG. 1 shows schematically a data processing system in accordance with an embodiment of the technology described herein.

A first embodiment of the technology described herein comprises a method of operating a data processing system comprising:

producing data in the form of blocks of data, where each block of data represents a particular region of an output data array;

storing the data in a memory of the data processing system; and reading the data from the memory in the form of lines;

wherein storing the data in the memory comprises:

storing each block of data of a first row of blocks of data in the memory at one or more memory addresses of a first set of memory addresses of a sequence of memory addresses for the memory; and storing each block of data of a second row of blocks of data in the memory at one or more memory addresses of a second set of different memory addresses of the sequence of memory addresses for the memory;

wherein at least some of the memory addresses of the second set of memory addresses fall between memory addresses of the first set of memory addresses in the sequence of memory addresses for the memory.

A second embodiment of the technology described herein comprises a data processing system comprising:

a first processing stage operable to produce data in the form of plural blocks of data, where each block of data represents a particular region of an output data array;

a second processing stage operable to read the data from the memory in the form of lines; and a memory;

wherein the data processing system is configured to store the data in the memory by:

storing each block of data of a first row of blocks of data in the memory one or more memory addresses of a first set of memory addresses of a sequence of memory addresses for the memory; and storing each block of data of a second row of blocks of data in the memory at one or more memory addresses of a second set of different memory addresses of the sequence of memory addresses for the memory;

wherein at least some of the memory addresses of the second set of memory addresses fall between memory addresses of the first set of memory addresses in the sequence of memory addresses for the memory.

The technology described herein is concerned with a method of operating a data processing system in which data is produced in the form of plural blocks of data that each represent a particular region of an output data array, and is then read in the form of lines.

In the technology described herein, blocks of data of a first row and a second row of blocks of data, e.g. of the output data array, are stored in a memory of the data processing system at respective memory addresses of a sequence of memory addresses for the memory.

However, at least some of the memory addresses at which data blocks of the second row are stored fall between memory addresses at which data blocks of the first row are stored in the sequence of memory addresses for the memory. In other words, rather than, e.g., storing the blocks of data of each row in the memory at contiguous memory addresses in the sequence of memory addresses, the first and second rows of blocks of data are instead stored in the memory such that their respective blocks of data are "mixed in", e.g. interleaved, together in the sequence of memory addresses for the memory.

As will be described in more detail below, this arrangement can facilitate more efficient and improved operation of the data processing system.

In particular, storing plural rows of blocks of data in the memory, e.g. whenever this is possible based on the size of the data block rows, has the effect of increasing the latency tolerance of the system. This is because, in de-tiler arrangements, where data is produced in the form of blocks of data and is then read in the form of lines, a full line width (i.e. a row) of blocks of data of the output array should be produced before the data can be read in the form of lines. This could lead to a bottleneck in the data processing system, where an entire row of blocks of data must be produced and stored in the memory before the data can be read from the memory. Accordingly, storing plural rows of blocks of data in the memory allows the data processing system to begin reading the data (in the form of lines) when the memory is only partially filled with data, and at the same time as (further) data is being produced and stored in the memory.

This also means that, where it is necessary for the data processing system to fetch data to be used to produce the blocks of data, e.g. by issuing read requests to an external memory via an interconnect or bus of the overall data processing system, the read requests in respect of plural rows of data blocks can be grouped together (rather than the read requests for each row being issued separately), thereby increasing the amount of silence on the bus (e.g. for use by other elements of the data processing system), and facilitating more efficient operation of the data processing system.

Moreover, storing plural rows of blocks of data in the memory such that their respective blocks of data are "mixed in" together, e.g. according to a particular pattern that will be described in more detail below, can allow the memory that is provided for storing the data to be utilised more efficiently, and can facilitate more efficient reading of the data in the form of lines by the data processing system.

It will be appreciated, therefore, that the technology described herein provides an improved data processing system and method of operating a data processing system.

The data processing system of the technology described herein is operable to produce data in the form of blocks of data, where each block of data represents a particular region (area) of an output data array.

The output data array in an embodiment comprises an array of plural data positions, with each data position taking a particular data (e.g. colour) value. In an embodiment, the data comprises image data, i.e. one or more arrays of image (colour) data, e.g. one or more frames, for display or otherwise.

In an embodiment, the data is produced in the form of (comprises) plural data words (e.g. such as plural Advance eXtensible Interface (AXI) words), where each word in an embodiment includes data in respect of multiple data positions of the data array.

Each block of data represents a particular region of the output data array. Each block of data should, and in an embodiment does, comprise at least two rows and at least two columns of data positions of the data array.

Thus, in an embodiment, the or each array of data produced by the data processing system is divided or partitioned into a plurality of identifiable smaller regions each representing a part of the overall array, and that can accordingly be represented as blocks of data.

The sub division of the or each array into blocks of data can be done as desired, and each block of data can represent any suitable and desired region (area) of the overall array of data.

Each block of data in an embodiment represents a different part (sub-region) of the overall array (although the blocks could overlap if desired). Each block should represent an appropriate portion (area) of the array (plurality of data positions within the array).

In an embodiment, the or each array of data produced by the data processing system is divided into regularly sized and shaped regions (blocks of data), in an embodiment in the form of squares or rectangles. Suitable data block sizes would be, e.g., 8×8, 16×8, 16×16, 32×4, 32×8, or 32×32 data positions in the data array. Other arrangements would, of course, be possible.

Thus, in an embodiment the or each array of data is divided into an array of regularly sized and shaped regions (blocks of data), e.g. such that the or each array comprises plural rows of blocks of data (e.g. that in an embodiment include the first and second rows of blocks of data of the technology described herein) and plural columns of blocks of data.

Each row of blocks of data should, and in an embodiment does, comprise a row of blocks of data that is one block high and many blocks wide (long). Each row of blocks of data in an embodiment has a width corresponding to (equal to) the width of the overall array of data produced by the (first processing stage of the) data processing system. Each row of blocks of data in an embodiment has a height corresponding to (equal to) the height of a single block of data produced by the (first processing stage of the) data processing system.

Correspondingly, each column of blocks of data should, and in an embodiment does, comprise a column of blocks of data that is one block wide and many blocks high. Each column of blocks of data in an embodiment has a height corresponding to (equal to) the height of the overall array of data produced by the (first processing stage of the) data processing system. Each column of blocks of data in an embodiment has a width corresponding to (equal to) the width of a single block of data produced by the (first processing stage of the) data processing system.

In an embodiment, each data block produced by the data processing system corresponds to a "tile", e.g. that a (first) processing stage of the data processing system produces as its output.

(In tile-based data processing systems, the two dimensional output array (e.g. frame) of the data processing system is sub-divided or partitioned into a plurality of smaller regions, usually referred to as "tiles", for the data processing. The tiles (sub-regions) may each be processed separately (e.g. one after another or in parallel). The tiles (sub-regions) may be recombined, if desired, to provide the complete output array (frame), e.g. for display.

Other terms that are commonly used for "tiling" and "tile based" processing include "chunking" (the sub-regions are referred to as "chunks") and "bucket" data processing. The terms "tile" and "tiling" will be used herein for convenience, but it should be understood that these terms are intended to encompass all alternative and equivalent terms and techniques.)

Where the data is produced as data words, each block of data in an embodiment comprises plural data words (e.g. plural AXI words), with each word in an embodiment including data in respect of multiple data positions of the block. Each of the blocks of data in an embodiment comprises the same number of data words, e.g. N data words.

The data processing system of the technology described herein may produce data in the form of blocks of data in any suitable manner. The blocks of data are in an embodiment produced in a block by block manner, i.e. from one block to the next, in an embodiment in raster line order (i.e. where the blocks of one row are produced in order, followed by the blocks of the next row, etc.), e.g. across the entire output data array.

The data processing system may comprise a first processing stage that is operable to produce data in the form of blocks of data. The first processing stage may comprise, for example, a decoder, a rotation stage, a graphics processing unit (GPU), a central processing unit (CPU), a video codec, a compositor, etc.

There may be a single first processing stage or there may be plural first processing stages operable to produce data in the form of blocks of data. Where there are plural first processing stages, then each first processing stage is in an embodiment operated in the manner of the first processing stage described above.

The data may be produced by the first processing stage generating the data, e.g. by generating the data itself, and/or by reading or receiving data from elsewhere (such as from memory or one or more other processing stages of the data processing system), and then processing (e.g. modifying) that data.

In embodiments where data is read from memory, the memory may comprise any suitable memory and may be configured in any suitable and desired manner. For example, it may be a memory that is on chip with and/or local to the processing stage in question or it may be an external memory. In an embodiment it is an external memory, such as a main memory of the data processing system. It may be dedicated memory for this purpose or it may be part of a memory that is used for other data as well. In an embodiment the data is read from (and stored in) a frame buffer.

Correspondingly, in embodiments where data is read from memory, the data processing system and/or the first processing stage may comprise a read controller, such as a Direct Memory Access (DMA) read controller operable to read data from the memory.

The data processing system and/or the first processing stage and/or the read controller may be configured to issue read requests to the (external) memory, e.g. in respect of the data required to produce each block of data. In this case, read requests in respect of the blocks of data of (at least) the first and second rows of blocks of data are in an embodiment grouped together (clustered or bundled), i.e. are in an embodiment issued at the same time or time period (e.g. substantially continuously, one after another).

In an embodiment, the (first processing stage of the) data processing system comprises a decoder, in an embodiment an ARM Frame Buffer Compression (AFBC) (or other block-based encoding scheme) decoder (AFBC is described in US A1 2013/0034309), which is operable to decode (decompress) data such as one or more received (in an embodiment AFBC) encoded (compressed) blocks of data, which are, e.g., read from memory. Accordingly, in this embodiment, the (first processing stage of the) data processing system comprises a (AFBC) decoder that decodes and/or decompresses (blocks of) (AFBC) encoded data to produce decoded and/or decompressed (e.g. colour) data (e.g. blocks of decoded and/or decompressed data).

In another embodiment, the (first processing stage of the) data processing system comprises a rotation stage which is operable to rotate data such as one or more received blocks of data, which are, e.g., read from memory. Accordingly, in this embodiment, the (first processing stage of the) data processing system comprises a rotation stage that rotates (blocks of) (e.g. colour) data to produce rotated data (e.g. blocks of rotated data).

The data produced by the data processing system is stored in a memory of the data processing system. The (first processing stage of the) data processing system in an embodiment writes the data to the memory, e.g. for reading in the form of lines.

Each block of data is in an embodiment stored in the memory when it is produced. Accordingly, where as described above, the blocks of data are produced in a block by block manner, then the blocks of data are in an embodiment stored in the memory in a block by block manner, i.e. from one block to the next, in an embodiment in raster line (row by row) order.

The memory is in an embodiment a (local) buffer memory, of the data processing system. Thus, the data should be (and is in an embodiment) not (is other than) written out (e.g. to external memory or otherwise) from the processor in question (e.g. display controller), but in an embodiment instead remains internal to the processor in question (e.g. display controller), when it is stored in (and read from) the memory.

In an embodiment the memory forms part of a "de-tiler", e.g. of a display controller, operable to convert data received in the form of one or more blocks (tiles) to data in the form of lines, e.g. for further processing and/or display. Thus, in an embodiment, the data processing system comprises a de-tiler, and the memory comprises a buffer memory of the de-tiler.

The memory should (and in an embodiment does) have a particular size, i.e. a total number of memory locations, e.g. for storing the produced data. Each of the memory locations in an embodiment has its own memory address. Each of the memory locations may be configured to store a single data word, but other arrangements would be possible.

It will be appreciated that since, in de-tiler arrangements, data is produced in the form of blocks (tiles) and then read in the form of lines, an appropriate (e.g. a full) line width of blocks (tiles) should be (and in an embodiment is) produced and stored in the memory before the set of data can be read "independently", i.e. before the data can be read in lines without requiring the production of further data while the set of data is being read. That is, at least one row of blocks of data should be (and in an embodiment is) produced and stored, where the row of blocks of data has a length (width) equal to the length (width) of each line of the overall data array.

Accordingly, the memory should be (and in an embodiment is) able to store at least a full line width (a full row) of blocks of data, e.g. in respect of the maximum (horizontal) output data array size (resolution) for which the data processing system is configured to produce (support). Thus, the memory in an embodiment has a size (i.e. a total number of memory addresses for storing the produced data) that is sufficient to store at least one (full) row of blocks of data for the maximum (horizontal) output data array size (resolution) that the data processing system is configured to produce.

In an embodiment, the memory is able to store only one full line width (one row) of blocks of data, e.g. in respect of the maximum (horizontal) output data array size (resolution) for which the data processing system is configured to produce (support) (it should be noted here that, as will be described in more detail below, in these embodiments, each of the first and second rows of data blocks that are stored in the memory in an embodiment has a size that is less than or equal to half of the maximum size (resolution) that the data processing system is configured to produce). That is, the memory in an embodiment has a size (i.e. a total number of memory addresses for storing the data) that is sufficient to store only (i.e. that is not (is other than) larger than is necessary to store) one (full) row of blocks of data for the maximum output data array size (resolution) that the data processing system is configured to produce. This beneficial means that the size of the memory that is provided for storing the data is minimised (or at least reduced).

The maximum (horizontal) output data array size (resolution) that the data processing system is configured to produce (support) may be selected as desired. It may be, for example, 8K, 4K, or HD, but any other arrangement would also be possible.

The manner in which the data is stored in the memory will be described in more detail below.

In the technology described herein, the data produced in the form of blocks is read in the form of lines, e.g. of the output data array. The data is in an embodiment read in raster (line) order, i.e. from line to line.

Thus, where the or each array of data produced by the (first processing stage of the) data processing system comprises an array of plural data positions, the array of data is in an embodiment read from data position to data position in raster line order. Correspondingly, where, as discussed above, the data comprises plural data words, the data words are in an embodiment used in raster (line) order, i.e. from word to word in raster line order.

Each line of data should, and in an embodiment does, comprise a row of data positions of the data array that is one data position high and many data positions wide (long). Each line in an embodiment has a width corresponding to (equal to) the width of the overall array of data produced by the (first processing stage of the) data processing system. Each line is in an embodiment read in full, but it would also be possible to only read a fraction of one or more or each line, e.g. half a line, etc.

Thus, in an embodiment, the data processing system is configured to produce regions in the form of two-dimensional blocks (arrays) of data positions (i.e. "tiles") of an output array (i.e. regions whose height and width are each greater than a single data position), to write those regions (blocks of data) to the memory, and to read the data array from the memory in raster order, i.e. in the form of lines (rows of data positions that are one data position high and many data positions wide (long)).

The data processing system of the technology described herein may be configured to read the data from the memory in the form of lines in any suitable manner.

The data processing system may comprise a second processing stage operable to read the data in the form of lines. The second processing stage may comprise or may form part of, e.g., a de-tiler (e.g. of a display controller), e.g. that is operable to convert data in the form of one or more blocks of data (tiles) to data in the form of one or more lines of data, e.g. for further processing and/or display.

There may be a single second processing stage or there may be plural second processing stages. Where there are plural second processing stages, then each second processing stage is in an embodiment operated in the manner of the second processing stage described above.

The manner in which the data is read in the form of lines will be described in more detail below.

In an embodiment, the data processing system is operable to process the read data.

In these embodiments, where, as discussed above, the data comprises plural data words, the data processing system in an embodiment reads the data words in raster (line) order, i.e. from word to word in raster line order, and then processes each word.

In an embodiment, the data processing system comprises a (pixel) unpacking processing stage operable to extract data in respect of each of plural individual data positions (pixels) from each of plural data words (i.e. where each data word comprises data in respect of multiple data positions of the overall data array).

The data in respect of each data position (pixel) may then be processed further. For example, in an embodiment, the data processing system may also comprise one or more layer or pixel processing pipelines operable to process the data in respect of each data position (pixel) as appropriate, e.g. for display.

Accordingly, in these embodiments, the (first processing stage of the) data processing system in an embodiment produces data in the form of plural data words (where each data word comprises data in respect of multiple data positions of the overall data array), the data is read on a word by word basis, and is then used (processed) on a data position by data position (e.g. pixel by pixel) basis.

The data processing system may also or instead be operable to cause at least some of the data and/or at least some of the processed data to be displayed. In an embodiment, the (display controller of the) data processing system is operable to provide the data (directly) to a display for display.

To facilitate this, the data processing system in an embodiment comprises an output stage operable to provide an image for display to a display. This output stage may be any suitable such output stage operable to provide an image for display to a display, e.g. to cause an image for display to be displayed on a display (to act as a display interface). The output stage in an embodiment comprises appropriate timing control functionality (e.g. it is configured to send pixel data to the display with appropriate horizontal and vertical blanking periods) for the display.

In an embodiment, the method of the technology described herein is (only) performed (and the data processing system is configured to operate in the manner of the technology described herein) when the (horizontal) size (resolution) of the output data array is less than or equal to half of the maximum (horizontal) output data array size (resolution) that the data processing system is configured to produce (support).

Where, as described above, the memory is able to store only one full line width (one row) of blocks of data of the maximum output (horizontal) data array size (resolution) that the data processing system is configured to produce, then this will accordingly mean that the combined size of the first and the second rows of data is less than or equal to the size of the memory. Correspondingly, each of the first and the second row of data blocks will have a size that is less than or equal to half the size of the memory.

Thus, according to an embodiment, the method of the technology described herein comprises (and the data processing system is configured to store the data in the memory by):

when each row of data blocks has a size that is less than or equal to half the size of the memory, storing each block of data of a set of plural rows of blocks of data (i.e. at least the first and second rows of blocks of data) in the memory, e.g. in the manner of the technology described herein.

On the other hand, when the (horizontal) size (resolution) of the output data array is greater than half of the maximum (horizontal) output data array size (resolution) that the data processing system is configured to produce (i.e. when each row of data blocks of the output data array has a size that is greater than half the size of the memory), the method in an embodiment comprises (and the data processing system is configured to store the data in the memory by) storing each block of data of a (single) row of blocks of data in the memory. In this case, the (adjacent) data blocks of each row of data blocks are in an embodiment stored at adjacent memory addresses in the sequence of memory addresses.

In these embodiments, it would be possible to only ever store two rows of blocks of data in the memory, i.e. whenever it is possible to do so (e.g. since each row of data blocks of the output data array has a size that is less than or equal to half the size of the memory) (and in one embodiment this is done), and to store one row or data blocks whenever this is not the case. However, in an embodiment, one or more other rows of blocks of data, e.g. of the output data array, may also be stored in the memory together with the first and second rows, e.g. and in an embodiment, when it is possible to do so.

In an embodiment, the data processing system is operable to select the number of rows of data blocks of the data array to store in the memory, in an embodiment depending on the (horizontal) size of the data array (i.e. depending on the size of each row of data blocks), and in an embodiment to then store that number of rows of blocks in the memory.

The number of rows of blocks is in an embodiment selected depending on how many rows of the data array it is possible to store in the memory.

Thus, in an embodiment, where the (horizontal) size (resolution) of the output data array is less than or equal to a particular fraction (1/n) of the maximum (horizontal) output data array size (resolution) that the data processing system is configured to produce (support) (i.e. when each row of data blocks of the output data array has a size that is less than or equal to a particular fraction (1/n) of the size of the memory), then each block of data of n rows (first to nth rows) of blocks of data is stored in the memory, in an embodiment respectively at one or more memory addresses of n (first to nth) sets of different memory addresses of the sequence of memory addresses for the memory.

Correspondingly, where the (horizontal) size (resolution) of the output data array is greater than a particular fraction (1/n) of the maximum (horizontal) output data array size (resolution) that the data processing system is configured to produce (support) (i.e. when each row of data blocks of the output data array has a size that is greater than a particular fraction (1/n) of the size of the memory), then each block of data of less than n rows of blocks of data is in an embodiment stored in the memory.

In these embodiments, the number (n) should be (and in an embodiment is) a positive integer, but may otherwise be selected as desired. For example, according to various embodiments n=1, 2, 3, 4, 5, 6, 7, 8, etc.

According to an embodiment, n is a power of two, e.g. n=1, 2, 4, 8, 16, etc. Constraining n to be a power of two can simplify the operation of the data processing system.

According to an embodiment, n is constrained to be one of a set of possible values. For example, and in one embodiment, n may be constrained to be one of 1, 2, 4 and 8. Again, constraining n in this manner can simplify the operation of the data processing system.

Thus, in an embodiment, the method comprises (and the data processing system is configured to store the data in the memory by):

when the (horizontal) size (resolution) of the output data array is greater than half of the maximum (horizontal) output data array size (resolution) that the data processing system is configured to produce (support) (i.e. when each row of data blocks of the output data array has a size that is greater than half the size of the memory):

storing each block of data of one (a first) row of blocks of data in the memory in an embodiment at one or more memory addresses of the sequence of memory addresses for the memory.

Similarly, in an embodiment, the method comprises (and the data processing system is configured to store the data in the memory by):

when the (horizontal) size (resolution) of the output data array is less than or equal to half of the maximum (horizontal) output data array size (resolution) that the data processing system is configured to produce (support) (i.e. when each row of data blocks of the output data array has a size that is less than or equal to half of the size of the memory); and when the (horizontal) size (resolution) of the output data array is greater than a quarter of the maximum (horizontal) output data array size (resolution) that the data processing system is configured to produce (support) (i.e. when each row of data blocks of the output data array has a size that is greater than a quarter of the size of the memory):

storing each block of data of two (a first and a second) rows of blocks of data in the memory in an embodiment respectively at one or more memory addresses of two (first and second) sets of different memory addresses of the sequence of memory addresses for the memory.

Similarly, in an embodiment, the method comprises (and the data processing system is configured to store the data in the memory by):

when the (horizontal) size (resolution) of the output data array is less than or equal to a quarter of the maximum (horizontal) output data array size (resolution) that the data processing system is configured to produce (support) (i.e. when each row of data blocks of the output data array has a size that is less than or equal to a quarter of the size of the memory); and when the (horizontal) size (resolution) of the output data array is greater than an eighth of the maximum (horizontal) output data array size (resolution) that the data processing system is configured to produce (support) (i.e. when each row of data blocks of the output data array has a size that is greater than an eighth of the size of the memory):

storing each block of data of four (first to fourth) rows of blocks of data in the memory in an embodiment respectively at one or more memory addresses of four (first to fourth) sets of different memory addresses of the sequence of memory addresses for the memory.

Similarly, the method in an embodiment comprises (and the data processing system is configured to store the data in the memory by):

when the (horizontal) size (resolution) of the output data array is less than or equal to an eighth of the maximum (horizontal) output data array size (resolution) that the data processing system is configured to produce (support) (i.e. when each row of data blocks of the output data array has a size that is less than or equal to an eighth of the size of the memory):

storing each block of data of eight (first to eighth) row of blocks of data in the memory in an embodiment respectively at one or more memory addresses of eight (first to eighth)

sets of different memory addresses of the sequence of memory addresses for the memory.

In the technology described herein, each block of data of plural rows of blocks of data is stored in the memory. Each row of data blocks should be (and in an embodiment is) a respective (full) row of data blocks of the output data array.

The first and second rows of data blocks of the technology described herein may each comprise any one of the plural rows of data blocks of the output array. For example, the first and second rows of data blocks may respectively comprise the first and second rows of data blocks of the data array to be produced (i.e. the "top" row and the next row), or they may comprise any other of the rows of data blocks of the output array.

The plural (e.g. first and second) rows of blocks of data are in an embodiment stored in the memory such that they are (eventually) present in the memory together, i.e. at the same time.

The plural (e.g. first and second) rows of data blocks that are stored in the memory are in an embodiment adjacent rows of data blocks of the output data array. Thus, in an embodiment, the blocks of data of plural adjacent rows of blocks of data of the overall output data array are stored in the memory together.

Where as described above, the blocks of data are produced in a block by block manner, i.e. from one block to the next (in raster line order), then each of the blocks of the first row will be (and in an embodiment are) produced and stored in the memory, and then each of the blocks of the second row will be (and in an embodiment are) produced and stored in the memory (and optionally then the next row, and so on).

In the technology described herein, each block of data of the plural (i.e. at least the first and the second) rows of blocks of data is stored in the memory at one or more particular memory addresses of a sequence of memory addresses for the memory.

The sequence of memory addresses for the memory can have any suitable and desired form. For example, the sequence of memory addresses may have a regular, in an embodiment linear, form, e.g. where the sequence of memory addresses increases monotonically. The sequence of memory addresses may, for example, begin with the first memory address for the memory and end with the last memory address for the memory.

Indeed, in an embodiment, the sequence of memory addresses initially has such a form, e.g. where the memory is empty and/or for storing the first row(s) of data of an array of data to be produced. (Although this need not be the case.)

It would also be possible for the sequence of memory addresses to be fixed, i.e. unchanging.

However, according to an embodiment, the sequence of memory addresses is not (always) regular or fixed in this manner, but is in an embodiment instead (at least in part) irregular, and, e.g., can change. In an embodiment, the sequence of memory addresses comprises a sequence of virtual memory addresses.

In this regard, the Applicants have recognised that the process of reading the data in the form of lines effectively frees up space within the memory that can be used to store additional data. In particular, when an amount of data has been read by the data processing system (in the form of lines) that corresponds to a block of data (e.g. when N data words have been read by the data processing system in the form of lines), a new block of data could be stored in the memory, i.e. using the "freed up" memory addresses.

Storing new blocks of data using the memory addresses "freed up" by the reading process has the effect of reducing latency in the system (in particular where, as described above, the memory of the technology described herein is able to store only one full line width (i.e. one row) of blocks of data for the maximum (horizontal) output data array size (resolution) that the data processing system is configured to produce), since blocks of data can be produced and stored in the memory substantially at the same time as data is being read from the memory in the form of lines.

However, since the form in which the data is read (i.e. lines) is different to the form in which it is produced (i.e. blocks), the sequence of memory addresses will not typically comprise a "linear" or fixed sequence of memory addresses, but will instead comprises a more complex sequence of memory addresses that, e.g., depends on the relationship between the blocks of data and the lines of data.

Thus, according to an embodiment, the data processing system is configured to read data from the memory in the form of lines by reading data (e.g. data words) from a read sequence of memory addresses for the memory, e.g. where the read sequence of memory addresses is in an embodiment arranged to appropriately take into account the relationship between the blocks of data and the lines of data, and the sequence of memory addresses of the technology described herein in an embodiment corresponds (at least in part) to (is at least in part the same as) this read sequence of memory addresses.

Thus, the sequence of memory addresses in an embodiment corresponds (at least in part) to a read sequence of memory addresses for reading data from the memory in the form of lines, in an embodiment for reading one or more other, in an embodiment previously produced, rows of data blocks (e.g. of the data array) in the form of lines.

In an embodiment, the sequence of memory addresses of the technology described herein initially comprises a regular, in an embodiment linear, sequence (e.g. where the sequence of memory addresses increases monotonically), e.g. for storing the first set of plural rows of data blocks of the data array, and then comprises a read sequence of memory addresses (for reading data from the memory in the form of lines), e.g. for storing subsequent sets of plural rows of data blocks of the data array.

The read sequence of memory addresses will be described in more detail below.

Each of the blocks of data of each row of blocks of data is stored at one or more memory addresses of a respective set of memory addresses of the sequence of memory addresses for the memory.

The blocks of data of each row should be (and in an embodiment are) stored at different memory addresses in the sequence of memory addresses for the memory. This will accordingly mean that each of the plural (e.g. at least the first and second) rows of blocks of data can be (and in an embodiment are) stored in the memory together, i.e. at the same time.

Each block of data should be (and in an embodiment is) stored at a contiguous set of plural memory addresses in the sequence of memory addresses. In an embodiment, where each block of data comprises plural data words (e.g. N data words), then each data word of each block is stored at a particular (single) memory address, and the data words of each block of data are in an embodiment stored at a group of contiguous (adjacent) memory addresses in the sequence of memory addresses. Other arrangements would be possible.

In the technology described herein, at least some of the memory addresses of the second set of memory addresses fall between memory addresses of the first set of memory addresses in the sequence of memory addresses for the memory. In an embodiment, one or more or each of the blocks of data of the second row of blocks of data are stored at memory addresses that fall between memory addresses at which blocks of data of the first row are stored in the sequence of memory addresses for the memory.

Correspondingly, in an embodiment, at least some of the memory addresses of the first set of memory addresses fall between memory addresses of the second set of memory addresses in the sequence of memory addresses for the memory. In an embodiment, one or more or each of the blocks of data of the first row of blocks of data are stored at memory addresses that fall between memory addresses at which blocks of data of the second row are stored in the sequence of memory addresses for the memory.

In an embodiment, each block of data of each row is stored at a memory address or memory addresses in the sequence of memory addresses that are separated from the memory addresses at which other blocks in that row are stored. Thus, where each block of data is stored at a contiguous set of memory addresses in the sequence of memory addresses, then the first and second sets of memory addresses will each comprise plural separated contiguous groups of memory addresses in the sequence of memory addresses. In other words, each block of data is in an embodiment stored at a contiguous set of (N) memory addresses in the sequence of memory addresses, and adjacent blocks of data of each row are in an embodiment stored at memory addresses that are separated (non-adjacent) in the sequence of memory addresses.

The number of memory addresses in the sequence of memory addresses that separates adjacent blocks of data of each row can be selected as desired. Adjacent blocks of data of each row are in an embodiment separated by the same number of memory addresses in the sequence of memory addresses.

In an embodiment, each block of data of each row is separated from the adjacent block or blocks of that row by a number of memory addresses in the sequence of memory addresses that is equal to an integer multiple of the number of memory addresses required to store a block of data.

Thus, for example, where each block of data requires N memory addresses to be stored (e.g. in respect of N data words), then each of the data blocks of each row is in an embodiment separated from the adjacent block or blocks of that row by an integer multiple of N memory addresses in the sequence of memory addresses. It will be appreciated that this arrangement means that an integer number of (other) blocks of data can be (and in an embodiment are) stored at the memory addresses between the memory addresses at which adjacent data blocks of the same row are stored, thereby making efficient use of the available memory resources.

In an embodiment, the number of memory addresses in the sequence of memory addresses that separates adjacent blocks of data of each row is selected depending on the number of rows of data blocks (n) that are to be stored in the memory together, e.g. and therefore depending on the (horizontal) size (resolution) of the output data array, i.e. depending on the size of each row of data blocks.

In an embodiment, adjacent blocks of data of each row are stored at memory addresses in the sequence of memory addresses that are separated by a number of memory addresses in the sequence of memory addresses that is sufficient to store one block of data from each of the other rows that are to be stored in the memory together with the data block row in question. In other words, the number of memory addresses in the sequence of memory addresses that separates adjacent blocks of data of each row is in an embodiment equal to the number of memory addresses required to store n−1 blocks of data (where n is the number of rows of data blocks that are to be stored in the memory together), e.g. N(n−1) memory addresses in the sequence of memory addresses.

Thus, for example, when two rows of data blocks are to be stored in the memory together (e.g. when the (horizontal) size (resolution) of the output data array is less than or equal to half of the maximum (horizontal) output data array size (resolution) that the data processing system is configured to produce), then adjacent blocks of data of each row of data blocks (of each of first and second rows) are in an embodiment stored at memory addresses in the sequence of memory addresses that are separated by N memory addresses in the sequence of memory addresses.

Similarly, when four rows of data blocks are to be stored in the memory together (e.g. when the (horizontal) size (resolution) of the output data array is less than or equal to a quarter of the maximum (horizontal) output data array size (resolution) that the data processing system is configured to produce), then adjacent blocks of data of each row of data blocks are in an embodiment stored at memory addresses in the sequence of memory addresses that are separated by 3N memory addresses, and so on.

In these embodiments, where adjacent data blocks of each row of data blocks are stored at memory addresses that are separated in the sequence of memory addresses by a memory address "gap", then the blocks of data of each of the other rows of data that are to be stored in the memory together with the data block row in question are in an embodiment stored at the memory addresses in the "gaps". In an embodiment, for each data block row, one block of data of each of the other data block rows is stored between each data block of the row in question in the sequence of memory addresses.

Each set of plural rows of blocks of data (that are to be stored in the memory together) is in an embodiment stored in the memory such that the respective blocks of data of each row are interleaved in the sequence of memory addresses for the memory. That is, in the sequence of memory addresses for the memory, a first block of a first row is stored, followed by a first block of a second row, optionally followed by a first block of a third row, etc., and then a second block of the first row is stored, followed by a second block of the second row, optionally followed by a second block of the third row, etc.

Accordingly, in an embodiment, although as described above the blocks of data are in an embodiment produced in a block by block manner in raster line order (i.e. where the blocks of one row are produced in order, followed by the blocks of the next row, etc.), the blocks of data of each set of plural rows (that are to be stored in the memory together) are in effect stored in the memory at memory addresses in the sequence of memory addresses that follow a column by column order (i.e. where the blocks of one column of the set of plural rows are stored in order, followed by the blocks of the next column, etc.).

Thus, for example, where two (first and second) rows of blocks of data are to be stored in the memory together, then the data blocks of the first row of blocks are in an embodiment stored in the memory at memory addresses in the sequence of memory addresses that are each separated by N memory addresses in the sequence of memory addresses. Each of the data blocks of the second row of blocks is in an embodiment then stored in the memory at the memory address "gaps" in the sequence of memory addresses between each of the blocks of data of the first row. Accordingly, the first and second rows of data blocks are in an embodiment stored in the memory such that their respective blocks of data are stored in an interleaved manner in the sequence of memory addresses for the memory.

Similarly, where four rows of blocks of data are to be stored in the memory together, then the data blocks of the first row of blocks are in an embodiment stored in the memory at memory addresses in the sequence of memory addresses that are separated by 3N memory addresses in the sequence of memory addresses. One data block from each of the second, third and fourth rows is in an embodiment then stored in the memory in the memory address "gaps" in the sequence of memory addresses between each of the blocks of data of the first row, in an embodiment in order. Accordingly, the first, second, third, and fourth rows of blocks of data are in an embodiment stored such that their respective blocks of data are stored in an interleaved manner in the sequence of memory addresses for the memory.

In the technology described herein the data stored in the memory is read in the form of lines, e.g. of the output data array. This in an embodiment involves reading the data from the memory in a line-by-line order.

Thus, the data processing system is in an embodiment configured to read some but not all of the data positions from multiple stored blocks of data consecutively (i.e. rather than reading a complete block before starting the next block), e.g. and in an embodiment, line by line, where each line comprises a concatenated respective row of data positions from plural different blocks of data. Thus, each line of data positions that is read by the data processing system is in an embodiment taken from plural different blocks of data (tiles) stored in the memory.

In an embodiment, the data positions from each corresponding line of each of plural blocks of data of each row of blocks of data are read consecutively, i.e. one after another before moving onto the next line. For example, the data positions in the top line of each of the blocks in a row of blocks can be read consecutively. The data positions in the second lines of each of the blocks in the row of blocks can then be read consecutively (together), and so on.

However since, as described above, the form in which the data is read (i.e. lines) is different to the form in which it is produced (i.e. blocks) (and since the blocks of data of plural different rows of blocks of data are stored in a "mixed in" manner), the sequence of memory addresses for the memory that should be read in order to properly read the data in the form of lines will not typically comprise a "linear" or fixed sequence of memory addresses, but will instead comprises a more complex sequence of memory addresses that, e.g., depends on the relationship between the blocks of data and the lines of data.

On the other hand, since the size of the blocks of data, the size of the lines of data, and the size of the memory are in an embodiment all fixed, then the read sequence of memory addresses for the memory will (and in an embodiment does) follow a particular, e.g. deterministic, pattern.

Thus, in an embodiment, reading the data in the form of lines comprises reading a, in an embodiment predetermined, sequence of memory addresses (a read sequence of memory addresses) for the memory.

In this regard, the Applicants have recognised that in order to read each line of data (where each line comprises a concatenated respective line of data positions from plural different blocks of data), the appropriate read sequence of memory addresses will (and in an embodiment does) comprise plural separated memory addresses or plural separated sets of contiguous memory addresses, e.g. where each memory address or each set of contiguous memory addresses corresponds to each line of data positions from each of the different blocks of data.

Accordingly, reading the data in the form of lines should (and in an embodiment does) comprise reading a memory address or a contiguous set of memory addresses in order, "skipping" a particular number of memory addresses of the memory addresses for the memory, and then reading another memory address or contiguous sets of memory addresses, "skipping" a particular number of memory addresses, and then reading another memory address or contiguous sets of memory addresses, and so on.

Moreover, the Applicants have recognised that where the data is stored in the memory in the manner of the embodiments, each of the memory addresses or sets of contiguous memory addresses should be (and in an embodiment are) separated by a particular, in an embodiment selected, number of memory addresses ("memory address skip"). The size of this memory address skip is in an embodiment the same in respect of each row or set of plural rows of data blocks that is stored in the memory.

Thus, when a particular row or set of plural rows of data blocks has been stored in the memory, the row or set of plural rows of data blocks is in an embodiment read in the form of lines by reading plural separated memory addresses or plural separated sets of contiguous memory addresses, where each memory address or set of contiguous memory addresses is separated by a particular, in an embodiment selected, in an embodiment constant, number of memory addresses.

The Applicants have furthermore recognised that the form of this read sequence of memory addresses is essentially the same for each successive row or set of plural rows of data blocks that is stored in the memory, regardless of the fact that the memory addresses at which each new row of data blocks is stored is in an embodiment "non-linear" as discussed above. In particular, the only change that is required to the read sequence of memory addresses between successive data block rows or between successive sets of plural data block rows is in an embodiment in the size of the memory address skip.

Moreover, the Applicants have recognised that the effect of "mixing in" the data blocks of plural data block rows in the manner of the embodiments, is again that the form of the read sequence of memory addresses is essentially the same, regardless of the number of rows of data blocks (n) that are stored in the memory. In particular, the only change that is required to the read sequence of memory addresses when the number of rows of data blocks (n) that are stored in the memory is changed is in an embodiment again in the size of the memory address skip. Furthermore, the necessary change to the size of the memory address skip is in an embodiment an integer multiple, which in an embodiment depends on the number of rows of data blocks (n) that are to be stored in the memory.

It will be appreciated that this means that the process of reading the data in the form of lines is relatively simple and uniform, e.g. irrespective of the number of rows of data blocks that are to be stored in the memory. This in turn means that the processing circuitry provided for this purpose can beneficially be less complex and will therefore require less chip area and consume less power.

Thus, in an embodiment, reading the data from the memory in the form of lines comprises reading data from plural sets of contiguous memory addresses, wherein each contiguous set of memory addresses is separated by a particular, in an embodiment selected, number of memory addresses ("memory address skip").

Each set of contiguous memory addresses in an embodiment comprises the same number of memory addresses, i.e., that in an embodiment correspond to a single line of data positions of a single block of data.

The size of the memory address skip is in an embodiment the same in respect of each row or set of plural rows of data blocks that is stored in and read from the memory. However, the size of the memory address skip may change between successive rows or sets of plural rows of data blocks that are stored in and read from the memory.

Thus, successive rows or sets of plural rows of data blocks, e.g. of the output data array, are in an embodiment successively stored in and read from the memory in the manner described above (e.g. beginning with the top data block row or set of adjacent data block rows of the output data array, followed by the next row or set of rows, etc.), where the size of the memory address skip used in the reading in an embodiment depends on (i.e. changes in dependence on) which of the data block rows or sets of data block rows of the data array is being read.

The size of the memory address skip in an embodiment also depends (i.e. changes in dependence on) on the number of data block rows (n) that are stored in the memory. Thus, the size of the memory address skip is in an embodiment a function of both the number of data block rows (n) that are stored in the memory, and which of the data block rows or sets of data block rows of the data array is being read.

In these embodiments, the read sequence of memory addresses should be (and in an embodiment is) configured to "wrap around" the memory addresses of the memory. That is, where "skipping" a particular number of memory addresses would result in a memory address that is outside of the range of memory addresses of the memory, the read sequence of memory addresses in an embodiment returns to the beginning of the memory addresses after passing the last memory address for the memory. A modulo operation is in an embodiment is used to achieve this. This ensures that the data is appropriately read out in the form of lines.

It is believed that the idea of reading data in the form of lines from a memory by reading contiguous sets of memory addresses that are separated by a particular number of memory addresses, where the particular number of memory addresses depends on the number of data block rows (n) that are stored in the memory (e.g. and therefore on the (horizontal) size (resolution) of the output data array, i.e. on the size of each data block row) is new and advantageous in its own right.

Thus, a third embodiment of the technology described herein comprises a method of operating a data processing system comprising:
producing data in the form of blocks of data, where each block of data represents a particular region of an output data array;
storing the data in a memory of the data processing system; and
reading the data from the memory in the form of lines;
wherein reading the data from the memory in the form of lines comprises reading data from plural contiguous sets of memory addresses for the memory; and
wherein the plural contiguous sets of memory addresses are each separated by a particular number of memory addresses that depends on the size of the output data array.

A fourth embodiment of the technology described herein comprises a data processing system comprising:

a first processing stage operable to produce data in the form of blocks of data, where each block of data represents a particular region of an output data array;
a second processing stage operable to read the data from the memory in the form of lines; and
a memory;
wherein the data processing system is configured to read the data from the memory in the form of lines by reading data from plural contiguous sets of memory addresses for the memory;
and wherein the plural contiguous sets of memory addresses are each separated by a particular number of memory addresses that depends on the size of the output data array.

As will be appreciated by those skilled in the art, these embodiments of the technology described herein can, and in an embodiment do, include one or more or all of the optional features of the technology described herein, as appropriate.

Thus, for example, storing the data in the memory in an embodiment comprises storing each block of data of a first row of blocks of data in the memory at one or more memory addresses of a first set of memory addresses of a sequence of memory addresses for the memory, and storing each block of data of a second row of blocks of data in the memory at one or more memory addresses of a second set of different memory addresses of the sequence of memory addresses for the memory, where at least some of the memory addresses of the second set of memory addresses in an embodiment fall between memory addresses of the first set of memory addresses in the sequence of memory addresses for the memory, e.g. and in an embodiment as described above.

Similarly, each set of contiguous memory addresses in an embodiment comprises the same number of memory addresses, e.g. and in an embodiment as described above.

The size of the memory address skip is in an embodiment the same in respect of each row or set of plural rows of data blocks that is successively stored in and read from the memory, but in an embodiment depends on (is a function of) which data block row or set of plural data block rows of the data array is being read, and in an embodiment also on the number of data block rows (n) that are stored in the memory, e.g. and in an embodiment as described above.

The read sequence of memory addresses is in an embodiment configured to "wrap around" the memory addresses of the memory, e.g. and in an embodiment as described above.

The data processing system of the technology described herein may comprise any suitable and desired data processing system. However, as will be appreciated by those having skill in the art, the technology described herein is particularly relevant to and useful in display controllers or data processing systems comprising display controllers.

Thus, in an embodiment, the data processing system of the technology described herein is or includes a display controller.

Correspondingly, another embodiment of the technology described herein comprises a method of operating a display controller for data processing system, the method comprising:
producing data in the form of blocks of data, where each block of data represents a particular region of an output data array;
storing the data in a memory of the display controller; and
reading the data from the memory in the form of lines;
wherein storing the data in the memory comprises:

storing each block of data of a first row of blocks of data in the memory at one or more memory addresses of a first set of memory addresses of a sequence of memory addresses for the memory; and storing each block of data of a second row of blocks of data in the memory at one or more memory addresses of a second set of different memory addresses of the sequence of memory addresses for the memory;

wherein at least some of the memory addresses of the second set of memory addresses fall between memory addresses of the first set of memory addresses in the sequence of memory addresses for the memory.

Another embodiment of the technology described herein comprises a display controller for a data processing system, the display controller comprising:

a first processing stage operable to produce data in the form of blocks of data, where each block of data represents a particular region of an output data array;

a second processing stage operable to read the data from the memory in the form of lines; and a memory;

wherein the display controller is configured to store the data in the memory by:

storing each block of data of a first row of blocks of data in the memory one or more memory addresses of a first set of memory addresses of a sequence of memory addresses for the memory; and storing each block of data of a second row of blocks of data in the memory at one or more memory addresses of a second set of different memory addresses of the sequence of memory addresses for the memory;

wherein at least some of the memory addresses of the second set of memory addresses fall between memory addresses of the first set of memory addresses in the sequence of memory addresses for the memory.

Another embodiment of the technology described herein comprises a method of operating a display controller for data processing system, the method comprising:

producing data in the form of blocks of data, where each block of data represents a particular region of an output data array;

storing the data in a memory of the display controller; and reading the data from the memory in the form of lines;

wherein reading the data from the memory in the form of lines comprises reading data from plural contiguous sets of memory addresses for the memory; and wherein the plural contiguous sets of memory addresses are each separated by a particular number of memory addresses that depends on the size of the output data array.

Another embodiment of the technology described herein comprises a display controller for a data processing system, the display controller comprising:

a first processing stage operable to produce data in the form of blocks of data, where each block of data represents a particular region of an output data array;

a second processing stage operable to read the data from the memory in the form of lines; and a memory;

wherein the display controller is configured to read the data from the memory in the form of lines by reading data from plural contiguous sets of memory addresses for the memory; and wherein the plural contiguous sets of memory addresses are each separated by a particular number of memory addresses that depends on the size of the output data array.

As will be appreciated by those skilled in the art, these embodiments of the technology described herein can, and in an embodiment do, include one or more or all of the optional features of the technology described herein, as appropriate.

The display controller may be any suitable and desired display controller and may comprise any suitable and desired additional processing stages that a display controller may include. The display controller should be and is in an embodiment operable to provide an image for display to a display.

The (first processing stage of the) display controller in an embodiment comprises a decoder and/or a rotation stage, in an embodiment together with a read controller, e.g. and in an embodiment as described above. The (second processing stage of the) display controller in an embodiment comprises a de-tiler processing stage, e.g. as discussed above, operable to convert data received in the form of one or more blocks (tiles) to data in the form of lines, e.g. for further processing and/or display, an (pixel) unpacking processing stage operable to extract data in respect of each of plural individual data positions (pixels) from each of plural data words, one or more layer or pixel processing pipelines operable to process the data in respect of each data position (pixel) as appropriate, e.g. for display, and/or an output stage operable to provide an image for display to a display, e.g. and in an embodiment as described above.

Although the technology described herein is described above with particular reference to the processing of a given data array (e.g. a frame for display), as will be appreciated by those skilled in the art, the technology described herein can be, and is in an embodiment, used for processing plural data arrays (e.g. providing plural frames for display), and in an embodiment for processing a sequence of data arrays (e.g. providing a sequence of frames to be displayed to a display).

The various stages of the data processing system may be implemented as desired, e.g. in the form of one or more fixed-function units (hardware) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various processing stages of the technology described herein may be provided as a separate circuit element(s) to other stages of the data processing system. However, one or more stages may also be at least partially formed of shared data processing circuitry.

One or more of the various stages of the technology described herein may be operable to always carry out its function on any and all received data. Additionally or alternatively, one of more of the stages may be operable to selectively carry out its function on the received data, i.e. when desired and/or appropriate.

The data processing system may and in an embodiment does also comprise one or more of, and in an embodiment all of: a central processing unit, a graphics processing unit, a video processor (codec), a system bus, a memory controller, an image signal processor, a display processing unit, and additional elements as known to those skilled in the art.

The data processing system may be, and in an embodiment is, configured to communicate with one or more of (and the technology described herein also extends to an arrangement comprising one or more of): an external memory (e.g. via the memory controller), one or more local displays, and/or one or more external displays.

In an embodiment, the data processing system further comprises a or the display. The display that the display controller is used with may be any suitable and desired display, such as for example, a screen (such as a panel) or a printer.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/ or in the form of programmable processing circuitry that can be programmed to perform the desired operation. Equally, any one or more of the processing stages and processing stage circuitry of the technology described herein may comprise a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the display processing pipeline can otherwise include any one or more or all of the usual functional units, etc., that display processing pipelines include.

The display processor in an embodiment also comprises, and/or is in communication with, one or more memories and/or memory devices that store the data described herein, and/or that store software for performing the processes described herein. The display processor may also be in communication with the host microprocessor, and/or with a display for displaying images based on the data generated by the display processor.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

FIG. 1 shows schematically a data processing system in accordance with an embodiment of the present embodiment. The data processing system comprises a video codec 1, central processing unit (CPU) 2, graphics processing unit (GPU) 3, display controller 4 and a memory controller 7. As shown in FIG. 1, these communicate via an interconnect 6 and have access to off-chip main memory 8. The video codec 1, CPU 2, and/or the GPU 3 generate output surfaces and store them, via the memory controller 7, in a frame buffer in the off-chip memory 8. The display controller 4 then reads output surfaces from the frame buffer in the off-chip memory 8 via the memory controller 8 and sends them to a display 5 for display.

Figure 2:
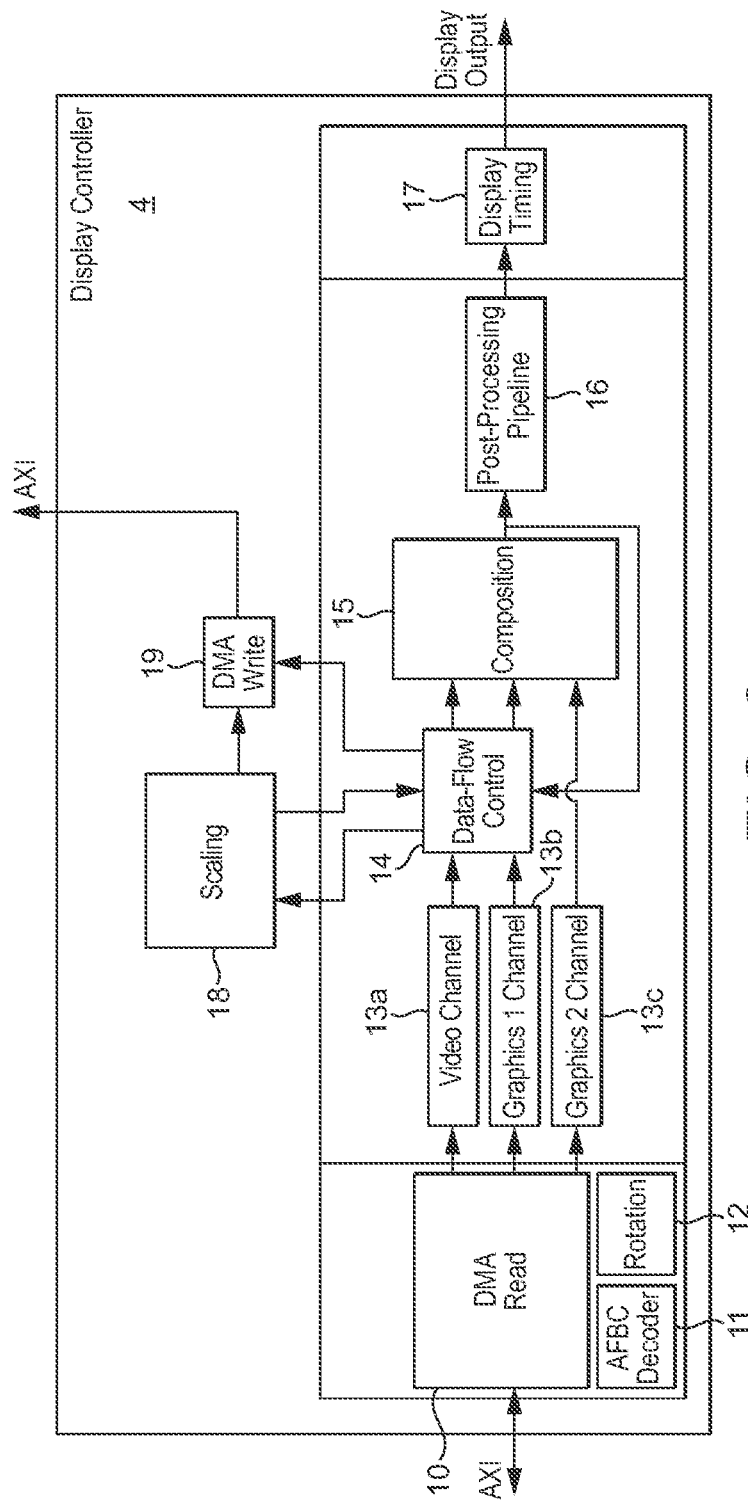
FIG. 2 shows schematically a display controller in accordance with an embodiment of the technology described herein.

FIG. 2 shows schematically a display controller 4 in accordance with an embodiment of the technology described herein. In FIG. 2, the rectangles represent functional units of the display controller, while the arrowed lines represent connections between the various functional units.

FIG. 2 shows the main elements of the display controller 4 that are relevant to the operation of the present embodiment. As will be appreciated by those skilled in the art there will be other elements of the display controller 4 that are not illustrated in FIG. 2. It should also be noted here that FIG. 2 is only schematic, and that, for example, in practice the shown functional units and stages may share significant hardware circuits, even though they are shown schematically as separate stages in FIG. 2. It will also be appreciated that each of the stages, elements and units, etc., of the display controller 4 as shown in FIG. 2 may be implemented as desired and will accordingly comprise, e.g., appropriate circuitry and/or processing logic, etc., for performing the necessary operation and functions.

In the present embodiment, the display controller 4 comprises a read controller in the form of a Direct Memory Access (DMA) read controller 10. The read controller 10 is configured to read one or more surfaces from main memory 8 (not shown in FIG. 2) via an interface such as an Advance eXtensible Interface (AXI). The one or more surfaces will typically be in the form of (optionally compressed) RGB data.

Co-located with the read controller 10 is a decoder 11 which can be used to (selectively) decode (decompress) received compressed surfaces as necessary, before onward transmission of the one or more decoded (decompressed) surfaces. The decoder 11 may comprise an ARM Frame Buffer Compression (AFBC) decoder (AFBC is described in US A1 2013/0034309). It would, of course, be possible to use other compression schemes. The use of compression reduces the bandwidth associated with the display controller 4 reading surfaces from the off-chip memory 8.

Similarly, rotation unit 12 can be used to selectively rotate one or more of the input surfaces as necessary before onward transmission of the one or more input surfaces.

In the illustrated embodiment, the read controller 4 is configured to (read) up to three different input surfaces (layers) which are to be used to generate a composited output frame. In this embodiment, the three input layers comprise one video layer, e.g. generated by a video processor (codec), and two graphics layers, e.g. two graphics windows generated by a graphics processing unit (GPU). Hence, FIG. 2 shows the displayer controller onwardly transmitting three input surfaces (display layers) via three layer pipelines or channels, namely video channel 13*a*, a first graphics channel 13*b*, and a second graphics channel 13*c*. Any or all of the transmitted input surfaces may have been subjected to decoding (decompression) by decoder 11 and/or rotation by rotation unit 12, as discussed above.

Although the embodiment of FIG. 2 illustrates the use of three input surfaces, it will be appreciated that any number of input surfaces (layers), and any combination of one or more types of input surface (e.g. video and/or graphics layers, etc.), may be used in the technology described herein, depending on the application in question (and also depending on any silicon area constraints, etc.). Equally, any number of layer pipelines or channels may be provided and used, as desired.

The display controller 4 of the present embodiment optionally comprises a multiplexer/data-flow control 14. Where present, the display controller may be configured such that multiplexer 14 receives inputs from any one or more (or all) of the input surface channels. The multiplexer 14 may operate to selectively transmit any one or more (or all) of the received inputs (i.e. surfaces) to any one or more of the multiplexer's 14 outputs.

The display controller 4 of the present embodiment optionally comprises a composition unit 15. Where present, the display controller 4 may be configured such that the composition unit 15 receives inputs directly from any one or more or all of the channels 13, and/or from the multiplexer 14. The composition unit 15 may operate to compose the received input surfaces to generate a composited output frame, i.e. by appropriate blending operations, etc. In the illustrated embodiment, the composited output frame may be onwardly transmitted by the composition unit 15 to multiplexer 14, and/or to post-processing pipeline 16.

The post-processing pipeline 16 is configured to selectively carry out any desired processing operation(s) on the (composited) output surface (frame). The post-processing pipeline 16 may, for example, comprise a colour conversion stage operable to apply a colour conversion to the (composited) output frame, a dithering stage operable to apply dithering to the (composited) output frame, and/or a gamma correction stage operable to carry out gamma correction on the (composited) output frame.

In the present embodiment, the post-processing pipeline 16 is configured to transmit the (processed) composited output frame to an output stage comprising a display timing unit 17 for appropriate display on a (local) display (not shown). The display timing unit 17 is configured to send pixel data to the display with appropriate horizontal and vertical blanking periods.

The display controller 4 of the present embodiment optionally comprises a scaling engine 18. Where present, the scaling engine 18 operates to (selectively) scale (i.e. upscale or downscale) any one or more received surfaces (frames) to generate a scaled surface (frame).

In the present embodiment, the display controller optionally comprises a write controller 19, e.g. in the form of a DMA write controller. Where present, the write controller 19 may be configured to write out received surfaces (frames) to external memory 8 (e.g. frame buffer), e.g. via AXI.

Thus, this embodiment of the technology described herein comprises a display controller that integrates a decoder 11, and a rotation unit 12, optionally together with a composition unit 15, and/or a scaling engine 18 capable of up and down-scaling surfaces. The decoder 11 and the rotation unit 12 are embedded within the display controller, such that surfaces read by the display controller 4 may be decoded (decompressed) and/or rotated (and then optionally further processed, e.g. composited and/or scaled) before being displayed, with only a single read (of each input surface) from the frame buffer being required.

Figure 3:
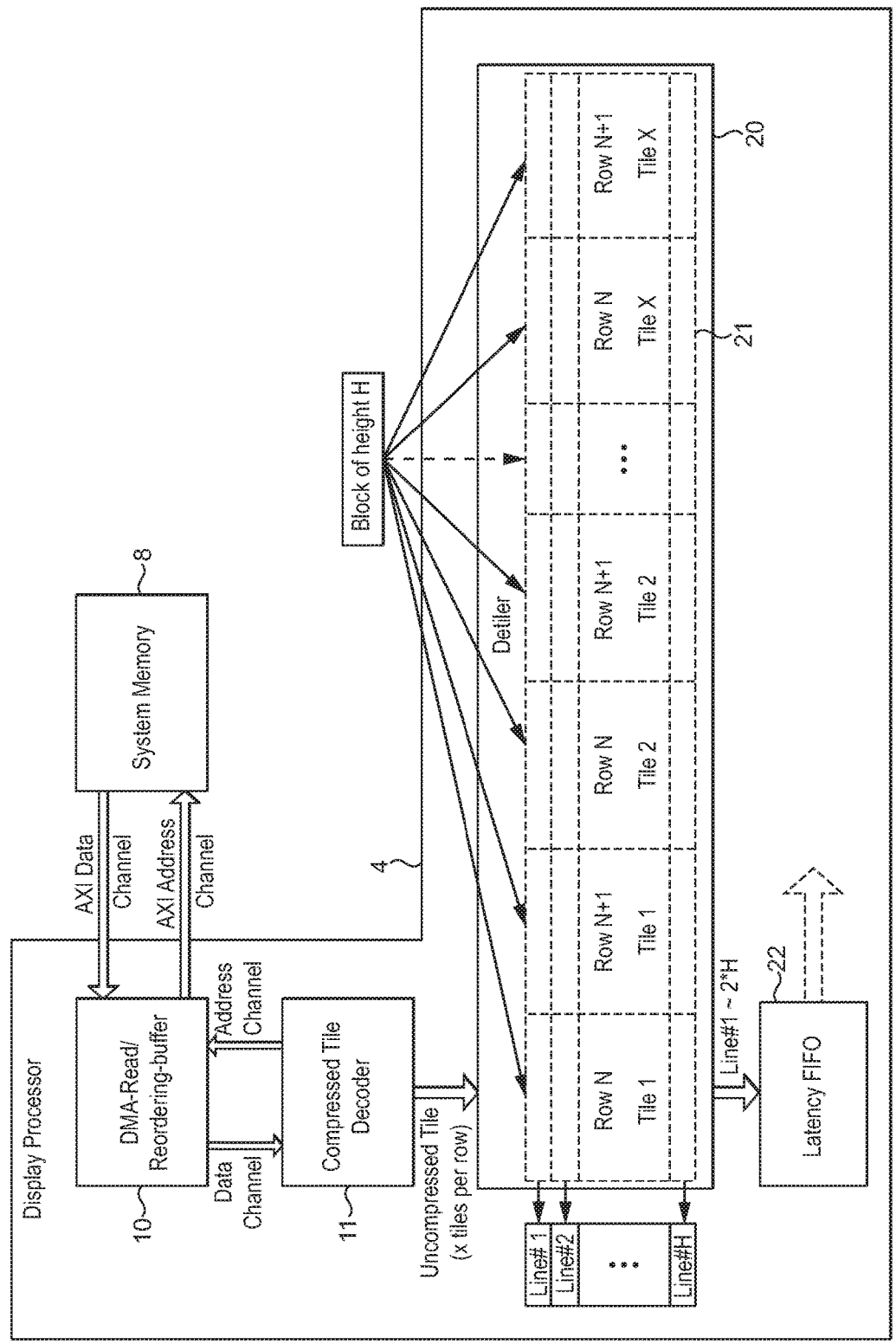
FIG. 3 shows schematically a portion of a display controller in accordance with an embodiment of the technology described herein.

FIG. 3 shows in more detail a portion of the display controller 4 that is particularly relevant to the operation of an embodiment. In this embodiment, one or more surfaces stored in the frame buffer in the off-chip memory 8 are compressed using AFBC or another block-based encoding scheme.

In AFBC and other block-based encoding schemes, each compressed surface is encoded as plural blocks (tiles) of data, where each block (tile) of data represents a particular region of the surface. Accordingly, the display controller 4 fetches each surface from the frame buffer in the off-chip memory 8 in blocks (tiles), i.e. block by block (tile by tile). In contrast, the display controller 4 provides output images for display to the display 5 in raster lines, i.e. rows of pixel positions that are one pixel position high and many pixels positions wide (long). Accordingly, the display controller 4 converts read block (tile) data into raster line data, and then sends the raster line data to the display 5 for display.

In the present embodiment, the read controller 10 is configured to read one or more blocks (tiles) of the compressed surface from main memory 8 via an interface such as an Advance eXtensible Interface (AXI). To do this, the read controller 10 sends requests to the memory 8 via an (AXI) address channel, and receives data from the memory 8 via a (AXI) data channel. The read controller 10 may comprise a re-ordering buffer to allow blocks (tiles) that are received by the read controller 10 out of order to be re-ordered, if desired.

The one or more compressed blocks (tiles) will be in the form of AFBC encoded RGB data.

Compressed blocks (tiles) read by the read controller 10 are then onwardly transmitted to the decoder 11 via an interface such as an AXI interface or a valid/ready interface. The decoder 11 operates to decode the compressed blocks (tiles) to produce uncompressed tiles, e.g. of RGB data. The uncompressed blocks are then onwardly transmitted to a de-tiler 20 in the form of data words such as AXI words. Each word will include data in respect of multiple pixels (data positions) of the block (tile).

The de-tiler 20 operates to convert the block (tile) data to raster line data. As shown in FIG. 3, in order to do this, the de-tiler 20 comprises a buffer memory 21. Block (tile) data received by the de-tiler 20 is written to the buffer 21 block by block (tile by tile), and then raster line data in the form of data words such as AXI width words is read out from the buffer 21 by reading the appropriate words for each raster line from the buffer 21.

The line data in the form of (AXI) words is then fed to a pixel unpacker or layer controller via a latency-hiding first in first out (FIFO) buffer 22. The pixel unpacker extracts data for individual pixels (data positions) from the received (AXI) words, and onwardly transmits the data to the appropriate channel or layer pipeline 13 for further processing (e.g. as discussed above).

Figure 4:
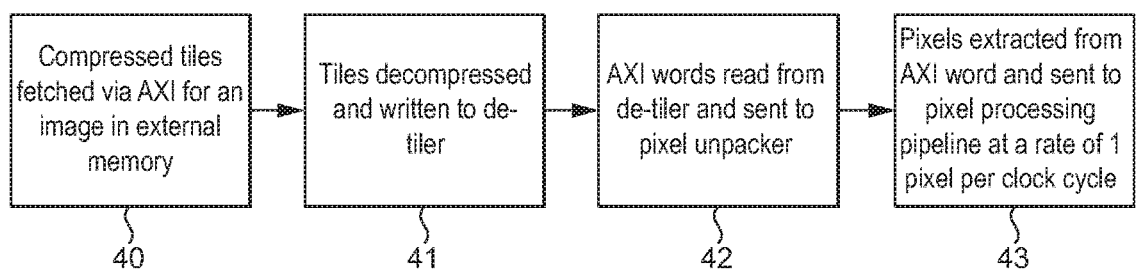
FIG. 4 shows schematically the operation of a display controller in accordance with an embodiment of the technology described herein.

FIG. 4 illustrates schematically the operation of the display controller 4 when fetching compressed block (tile) data and converting it into line data. As shown in FIG. 4, compressed blocks (e.g. of an AFBC compressed layer) are fetched from external memory 8 via an (AXI) interface (step 30). The blocks are decompressed and written to de-tiler 20 (step 31). Data words (AXI words) are then read from the de-tiler 20 and sent to the pixel unpacker 23 (step 32). Data in respect of individual pixels is extracted from the (AXI) words and sent to layer or pixel processing pipeline 13, e.g. at a rate of 1 pixel per clock cycle (step 33).

In de-tiler arrangements, as shown in FIG. 3, a sequence of (X) blocks (tiles) corresponding to an entire line (frame) width of blocks (tiles), i.e. a row of blocks, should be written to the de-tiler buffer 21 before the block data can be read out in lines. However, this can result in a bottleneck in the system, where it is necessary to wait for an entire row of blocks to be written to the de-tiler buffer 21 before the block data can be read out in lines, and to then wait for the entire row of blocks to be read out in lines before a further row of blocks can be written to the de-tiler buffer 21, etc.

It would be possible to address this using a so-called "ping pong" buffer arrangement, wherein, while a first row of block data is being read out from a first buffer in lines, a second row of block data is written to a second buffer. However, this is relatively expensive in terms of buffers resources, since it would be necessary to configure the buffer to be able to store at least two rows of blocks of data for the maximum resolution data array that the display controller 4 is configured to support. In other words, the number of line buffers required would be twice the height of each tile.

The Applicants have recognised that it is, in fact, possible to address the above-described problem while configuring the buffer 21 to be able to store only a single row of blocks of data for the maximum resolution data array that the display controller 4 is configured to support, and that this is more efficient, e.g. in terms of use of resources and power consumption of the data processing system.

In particular, when lines of data words are read from the de-tiling buffer 21, the next arriving blocks of data are able to be written into the de-tiling buffer by taking advantage of sufficient space having been freed by the reading. In particular, when a number of data words (N) corresponding to a block of data has been read from the de-tiling buffer 21 (despite the fact that the reading is not itself performed in terms of blocks, but rather in terms of lines (pixel rows)), the next arriving block of data can be directly written to the space which has been released by the reading procedure.

Furthermore, when reading out a line (i.e. a frame width pixel row), a sequence of read buffer addresses which comprises "jumps" or "skip steps" can be used to account for the fact that the buffer addresses are written to in blocks, but read from in lines. The size of these skip steps is commensurately increased for each block row of a data array which is passed through the de-tiling buffer, but eventually the increase in size of these skip steps will "wrap around" and the pattern of reads and writes repeats.

Where there are plural data words in each pixel line of each block, then when reading data words for a pixel row from the de-tiling buffer 21, sequential buffer addresses corresponding to the number of data words in each pixel line of each block are read, interspersed by the skip steps which increase in size until they wrap around, i.e. the skip step returns to zero.

It will be appreciated that this arrangement provides a particularly simple and efficient reading procedure for reading the data in the form of lines.

Figure 5:
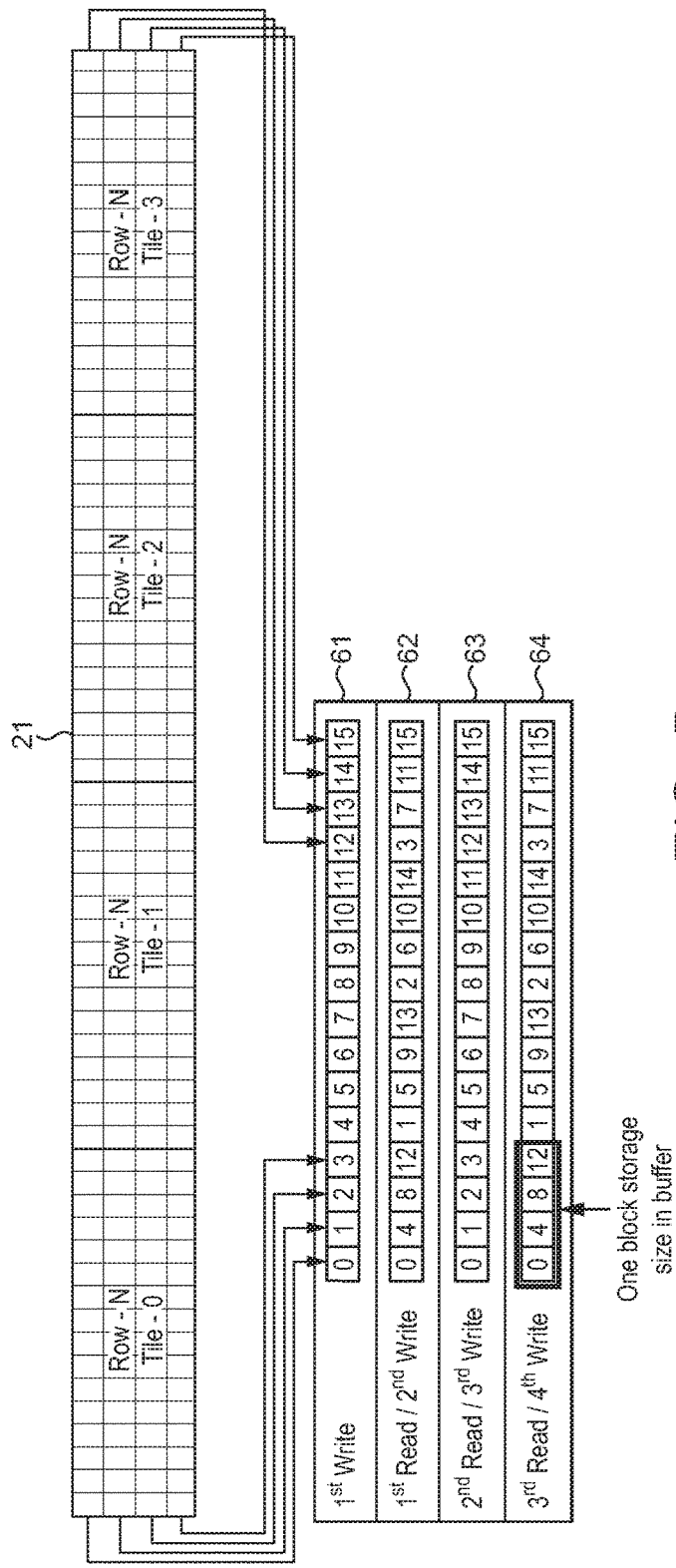
FIG. 5 shows schematically the operation of a display controller in accordance with an embodiment of the technology described herein.

FIG. 5 illustrates this addressing scheme. FIG. 5 shows an arrangement comprising a de-tiler buffer 21 that has a total of 16 memory locations with addresses 0-15, where each tile of the output data array (frame) occupies four memory addresses. Accordingly, the buffer 21 can accommodate a row of four tiles.

Although each line (row) of data positions of each tile is shown as being accommodated by a single memory address in FIG. 5, in practice each line (row) of data positions of each tile may instead be accommodated by a set of contiguous memory addresses. Equally, although FIG. 5 shows an arrangement in which the de-tiler buffer 21 can accommodate a row of four tiles, in practice the de-tiler buffer may be configured to accommodate any number of rows of tiles, e.g. many more than four, e.g. depending on the maximum resolution data array that the display controller 4 is configured to support.

As shown in FIG. 5, a row of tiles (row N) of an output data array (frame) comprising four tiles (tile 0 to tile 3) is initially written to the buffer 21 using a linear sequence of memory addresses 0-15 (step 61). In order to read out the top line of the row of tiles, memory addresses 0, 4, 8 and 12 are then read in order, and in order to read each of the following lines of tiles, memory addresses 1, 5, 9, 13; 2, 6, 10, 14; and then 3, 7, 11, 15 are read in order (step 62).

Since in this illustrative example, each line occupies the same number of memory addresses as each tile, after memory addresses 0, 4, 8 and 12 have been read, a further tile, e.g. of the next row (row N+1) can be written to these "freed up" memory addresses. Similarly, after reading the memory addresses in respect of each line, a further tile of the next row (row N+1) can be written to the "freed up" memory addresses.

Accordingly, the tiles of the next row of tiles (row N+1) are written to the memory at memory addresses that follow the read pattern. Hence, step 62 illustrates both the read and the subsequent write operations.

As shown in FIG. 5, in order to read this next row of tiles (row N+1) in the form of lines, a different sequence of memory addresses is used, namely the linear sequence 0-15 (step 63). As also illustrated by step 63, the tiles of the next row of tiles (row N+2) are written to the memory at memory addresses that follow this read pattern.

As such, the pattern of writes and reads effectively repeats itself. Accordingly, step 64 illustrates the sequence of buffer addresses for reading row N+2 and the sequence of buffer addresses for writing of the next row of tiles (row N+3) to the buffer 21, which corresponds to step 62.

In general, after a first tile row has been written to sequential buffer addresses, the skip steps required to read out the lines of pixel data (and indeed to then write further block data into the buffer addresses freed up by that read) is represented by:

$$B \cdot (N/B)^R - (B-1),$$

where R is the tile row number, B is the number of data words in each pixel line of a tile, and N is the number of data words used for each tile.

Hence for example with reference to FIG. 5, where N=4 and B=1, the skip steps are given by $1 \times (4/1)^R - (1-1)$, i.e. $1 \cdot (4)^R - 0$, being 4 for the first read/second write (step 62), 16 for the second read/third write (step 63), and 64 for the third read/fourth write (step 64). This step size is configured to "wrap-around", i.e. in order to be appropriately constrained within the memory locations of the memory.

The memory addresses are subject to modulo M, where M is the number of data words in each frame-width tile row, i.e. the memory address returns to the first memory address (0) after the last memory address (15).

The Applicants have furthermore recognised that in these arrangements, where the horizontal size (resolution) of the output data array (frame) is less than the maximum supported resolution, then the de-tiler buffer 21 will effectively be underutilised. Accordingly, where possible, it would be desirable to store more than one row of tiles in the buffer 21.

Storing more than one row of tiles in the buffer 21 has the effect of increasing the latency tolerance of the system. This is because doing so allows the de-tiler 20 to begin reading the data in the form of lines when the buffer 21 is only partially filled with data, and at the same time as (further) data is being produced and stored in the buffer 21.

In the present embodiment, the de-tiler 20 is operable to store plural rows of tiles in the buffer 21 together when it is possible to do so, e.g. when the horizontal size of the output data array is a fraction of the maximum supported resolution.

For example, where the maximum supported horizontal resolution is 4K, for layers having a size of between 4K and 2K, the de-tiler 20 can buffer one row of tiles (using the above described addressing scheme). For layers having a size of between 2K and 1K, the de-tiler 20 can buffer two rows of tiles. For layers having a size of between 1K and 0.5K, the de-tiler 20 can buffer four rows of tiles. For layers having a size of between 0.5K and 0.25K, the de-tiler 2 can buffer eight rows of tiles, etc.

One conceptually simple way to implement this would be to store each row of the plural rows of tiles separately, e.g. each occupying its own contiguous set of memory addresses in the buffer 21. However, this would require, inter alia, the provision of plural pointers in order to keep track of each row of tiles in the memory separately, and would therefore be relatively complex.

The Applicants have recognised that an improved way to store plural rows of tiles in the de-tiler buffer 21 is to store the tiles of each of the plural rows in an interspersed, e.g. interleaved, manner.

For example, where two rows of tiles are to be stored in the memory together, the tiles of each row are stored in the memory in an interleaved manner. Where four rows of tiles are to be stored in the memory together, the tiles of each row are stored in the memory in an interleaved manner, e.g. such that the first tile of the first row is stored, followed by the first tile of the second row, the first tile of the third row, the first tile of the fourth row, and then the second tile of the first row, and so on.

In order to facilitate this, the tiles of each row are stored in the memory using separated memory addresses.

Thus, for example, where two rows of tiles are to be stored in the memory, after writing one tile of the first row to the de-tiler buffer 21, the address space that would be required for the next tile is not written to, but instead the next in-coming tile is written to the address space that would otherwise be used for the next-but-one tile. After writing the first row of tiles in this manner, the second row of tiles is written to the empty spaces that were left unwritten when writing the first row of tiles.

Figure 6:
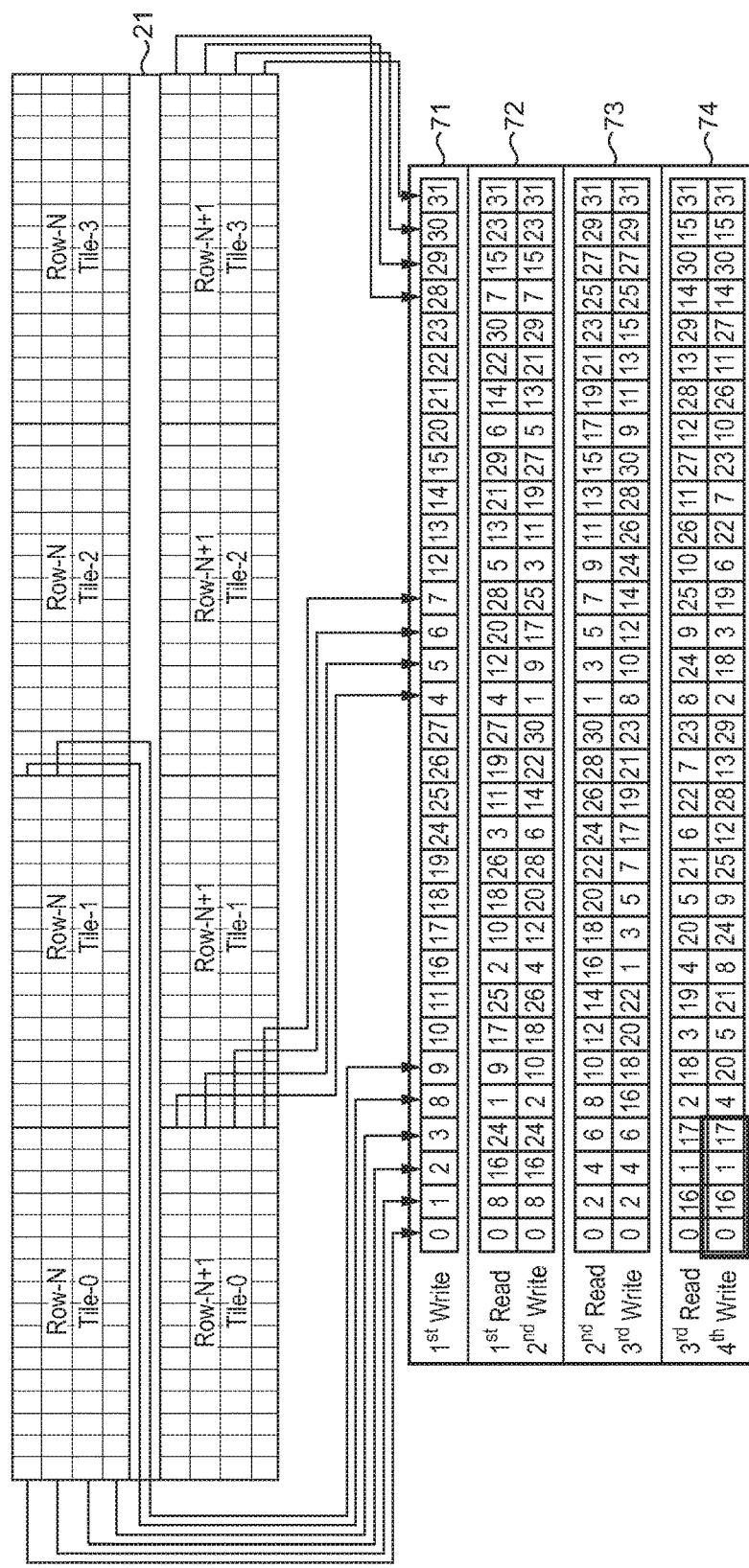
FIG. 6 shows schematically the operation of a display controller in accordance with another embodiment of the technology described herein.

The address scheme of the present embodiment is illustrated in more detail by FIG. 6. FIG. 6 shows an arrangement comprising a de-tiler buffer 21 that has a total of 32 memory locations with memory address 0-31, where each tile of the output data array (frame) occupies four memory addresses. Accordingly, the buffer 21 can accommodate two rows of tiles, where each row comprises four tiles.

Although each line (row) of data positions of each tile is shown as being accommodated by a single memory address in FIG. 6, in practice each line (row) of data positions of each tile may instead be accommodated by a set of contiguous memory addresses. Equally, although FIG. 6 shows an arrangement in which the de-tiler buffer 21 can accommodate two rows of four tiles, in practice the de-tiler buffer may be configured to accommodate any number of rows of tiles, e.g. many more than this, e.g. depending on the maximum resolution data array that the display controller 4 is configured to support.

As shown in FIG. 6, a first row of tiles (row N) comprising four tiles is initially written to the buffer 21 (step 71). The first tile (tile 0) is written to the first available memory addresses, namely memory addressees 0-3. However, since in this example two rows of tiles are to be written to the buffer 21, the next tile in the row (row N) (tile 1) is written to memory addresses 8-11. That is, a gap of four memory addresses (namely memory addresses 4-7) is left between tile 0 and tile 1 of row N. Similarly, the third tile (tile 2) is written to memory addresses 16-19 and the fourth tile (tile-3) is written to memory addresses 24-27.

Next (in step 71), the tiles of the second row of tiles (row N+1) are written to the buffer 21 at memory addresses between the memory addresses that tiles of the first row were written to. Accordingly, tile 0 of row N+1 is written to memory addresses 4-7, tile 1 of row N+1 is written to memory addresses 12-15, tile 2 of row N+1 is written to memory addresses 20-23, and tile 3 of row N+1 is written to memory addresses 28-31.

Now, in order to read the first row (row N) in the form of lines, it can be seen from FIG. 6, that memory addresses 0, 8, 16, 24; 1, 9, 17, 25; 2, 10, 18, 26; and then 3, 11, 19, 27 should be read. Similarly, in order to read the second row (row N+1) in the form of lines, it can be seen from FIG. 6, that memory addresses 4, 12, 20, 28; 5, 13, 21, 29; 6, 14, 22, 30; and then 7, 15, 23, 31 should be read (step 72).

It will be appreciated that in this example, each memory address in this read sequence of memory addresses is separated by 8 memory addresses (where the memory addresses "wrap around" to memory address 0 from memory address 31).

In step 72, the third (row N+2) and fourth (row N+3) rows are written to the memory using this read sequence of memory addresses. However, in a corresponding manner to that described above, adjacent tiles of the third row (row N+2) are stored using memory addresses that are separated by a memory address gap in the sequence of memory addresses. The memory address gaps are then filled with tiles from the fourth row (row N+3) of tiles.

Accordingly, the first tile of the third row (row N+2) is written to the first available memory addresses, namely memory addresses 0, 8, 16, 24, and then the following tiles are written to memory addresses 2, 10, 18, 26 (i.e. leaving out memory addresses 1, 9, 17, 25 in the sequence of memory addresses); 4, 12, 10, 28; and then 6, 14, 22, 30. The tiles of the fourth row (row N+3) are then written to memory addresses 1, 9, 17, 25; 3, 11, 19, 27; 5, 13, 21, 29; and then 7, 15, 23, 31.

It can again be seen from the "$2^{nd}$ read" step in step 73 of FIG. 6 that the consequence of storing the two rows of tiles in the buffer 21 in this "mixed in" manner is that the memory addresses that should be read in order to read out the third and fourth rows in the form of lines are separated by a constant memory address skip step, namely two memory addresses in this example.

As shown in FIG. 6, this pattern of writing and reading is repeated for the following rows of data of the data array (frame) (steps 73, 74).

In general, the read sequence of memory addresses that is required to read plural rows of tiles stored together in the buffer 21 in the interleaved manner of the present embodiment is similar to the read sequence of memory addresses that is required to read a single row of tiles stored in the buffer 21 in the manner described above in relation to FIG. 5, except that the memory address skip step is different.

In particular, where two rows of tiles are stored in the buffer 21, when reading the data from the buffer 21 in raster scan order, read addresses are generated using essentially the same scheme, but assuming that the tile height is double the actual value.

More generally, where n rows of tiles are stored in the buffer 21, when reading the data from the buffer 21 in raster scan order, read addresses are generated using essentially the same scheme as described above in relation to FIG. 5, but assuming that the tile height is n times the actual value. This facilitates a particularly simple and seamless de-tiling operation, regardless of the number of rows of tiles that are stored in the de-tiler buffer 21.

As described above, the buffering of multiple rows of tiles where possible in the manner of the present embodiment also allows significantly improved latency tolerance while consuming the same amount of power as would be used if only one row was buffered at a time, and also allows improved clustering/bundling of memory read transactions, which beneficially results in longer periods of silence on the interconnect or bus 6.

Figure 7:
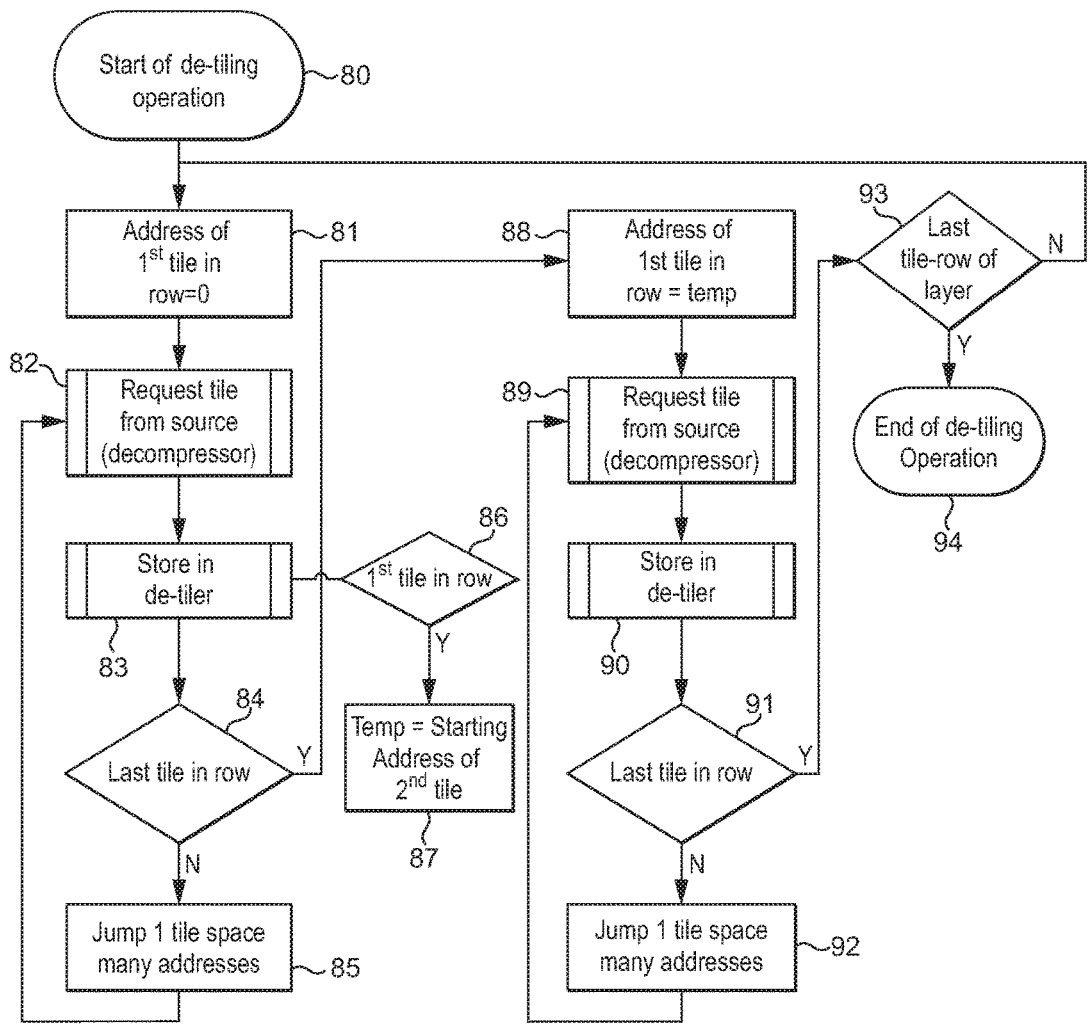
FIG. 7 shows schematically the operation of a display controller in accordance with an embodiment of the technology described herein.

FIG. 7 illustrates a de-tiling process according to the present embodiment.

The process begins when the de-tiling operation begins (step 80). The first tile of the current row of tiles is written to the first memory address (memory address 0) of the buffer 21. This is done by the de-tiler 20 setting the address to zero (step 81), requesting the tile data from the source (e.g. the decoder 11) (step 82), and storing the tile data in the de-tiler buffer 21 (step 83).

When this first tile has been stored in the buffer, a record (named "Temp") is made of the next available memory address (steps 86, 87) of the buffer 21.

The writing process then jumps a number of memory addresses equal to the number of memory addresses required to store one tile (step 85), and stores the next tile in the current row of tiles in the buffer 21 at the next set of memory addresses. Again, this is done by the de-tiler 20 requesting the tile data from the source (e.g. the decoder 11) (step 82), and storing the tile data in the de-tiler buffer 21 (step 83).

When the last tile in the current row of tiles has been stored in the buffer in this manner (when step 84 is satisfied), the process then moves on to store the next row of tiles in the buffer 21.

The first tile of this next row of tiles is written to the first available memory address of the buffer 21. This is done by the de-tiler 20 setting the address to the recorded memory address (i.e. "Temp") (step 88), requesting the tile data from the source (e.g. the decoder 11) (step 89), and storing the tile data in the de-tiler buffer 21 (step 90).

The writing process then jumps a number of memory addresses equal to the number of memory addresses required to store one tile (step 92), and stores the next tile in the current row of tiles in the buffer 21 at the next set of memory addresses. Again, this is done by the de-tiler 20 requesting the tile data from the source (e.g. the decoder 11) (step 89), and storing the tile data in the de-tiler buffer 21 (step 90).

When the last tile in this next row of tiles has been stored in the buffer in this manner (when step 91 is satisfied), the process is then iteratively repeated in respect of the remaining rows of tiles of the current layer, and ends at step 94 when it is determined (at step 93) that the last row of tiles has been reached.

When two rows of tiles are to be stored in the buffer 21, the complete addressing scheme, where NumLB is the tile height and ALW is the layer width, is defined as follows:

$Adr_{1st\_NZ} = 1$
for (j = 0; j < (LayerHeight −(NumLB×2)); j = (j + NumLB×2))
{
    $Adr_0$=First NonZero address in last writex(NumLB×2)
    $Adr_1$={$Adr_0$<(ALW×2)→$Adr_0$
        $Adr_0$≥(ALW×2)→mod($Adr_0$,ALW×2)
    for (i = 0; i < ALW ×2; i++)
    {
        $Var_0$=(i,NumLB)
        $Offset_0$= { $Var_0$ !=0 →0
                $Var_0$==0→NumLB
        $Offset_1$=$Offset_0$×Adr1
        if(mod(i, ALW) ==0)

-continued

```
        {
                Adr₂=(i==0) ? 0: Offset₁
        }
        else
        {
                Adr₂=Adr_previous+Adr₁+Offset₁
        }
        RdAdr= (Adr₂,(ALW×2)-1)
        Adr_Previous=RdAdr
        if(i == 1)
        {
                Adr_{1st_Nz}=RdAdr
        }
    }
}
```

It will be appreciated that this scheme can be modified in a relatively straightforward manner in order to store any number of rows of tiles in the buffer 21.

For example, for a maximum supported horizontal resolution of 4096 pixels, for layers having the various different sizes shown in Table 1, the number of rows of tiles that are shown in the table can be stored together in the buffer 21.

TABLE 1

| Maximum Layer Size | Minimum Layer Size | Number of Buffer-able Rows of Tiles |
|---|---|---|
| 4096 | 2049 | 1 |
| 2048 | 1025 | 2 |
| 1024 | 513 | 4 |
| 512 | 257 | 8 |

Figure 8:
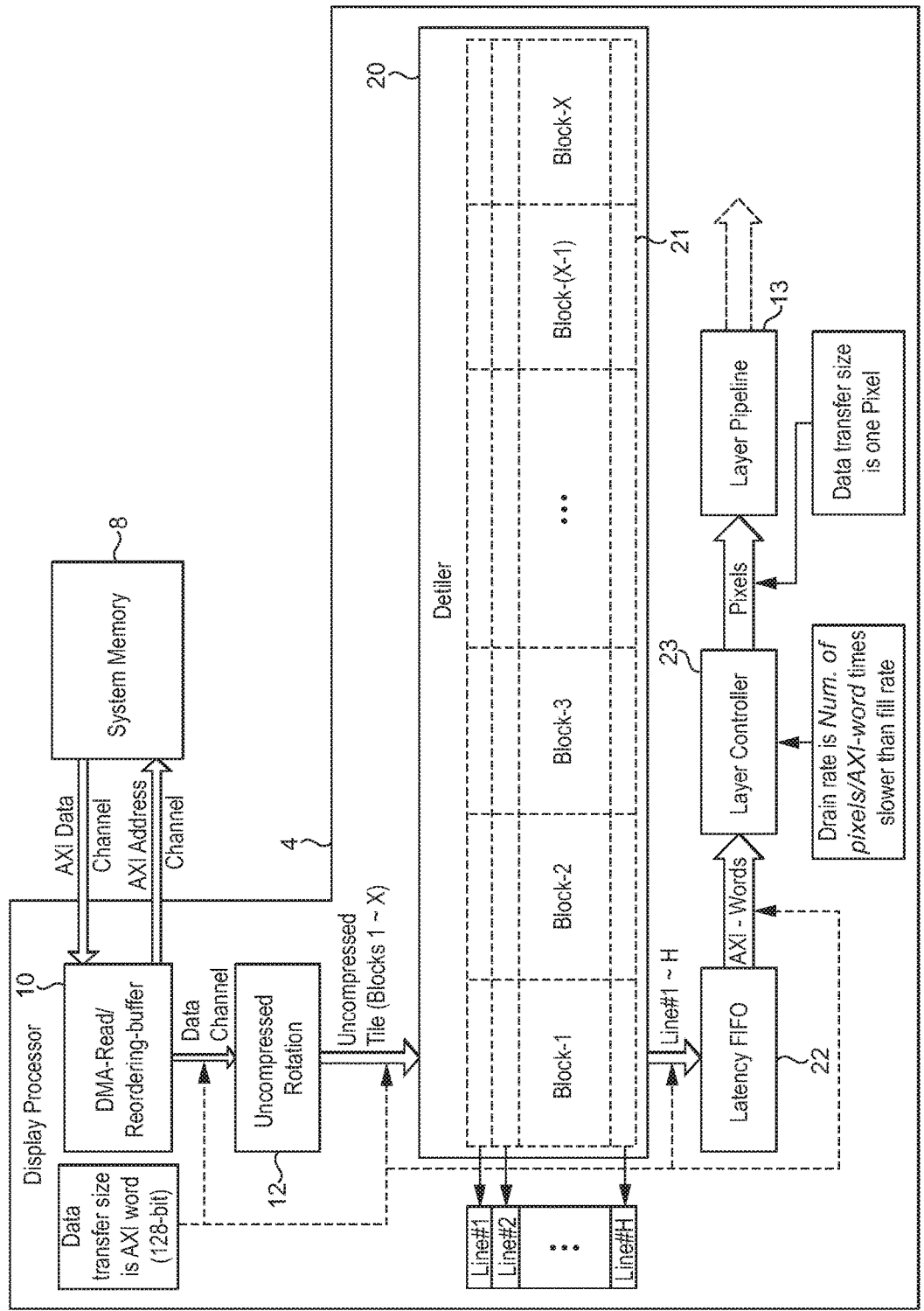
FIG. 8 shows schematically the operation of a display controller in accordance with an embodiment of the technology described herein.

FIG. 8 shows schematically a display controller 4 in accordance with another embodiment. FIG. 8 is similar to FIG. 3, and operates in a substantially similar manner. However, in place of the decoder 11 of FIG. 3 is a rotation stage 12, which e.g. operates to rotate received blocks of data.

Thus, in the embodiment of FIG. 8, the read controller 10 operates to read one or more (uncompressed) surfaces from memory 8, and to pass that data to the rotation stage 12. As shown in FIG. 8, these columns are fed to the rotation block 12, which rotates the data as appropriate, and writes the data to the de-tiler buffer 21 in (AXI) words. The de-tiler 20 reads the data out from the buffer 21 in raster scan order as (AXI) words, and feeds it to the layer controller 23.

Figure 9:
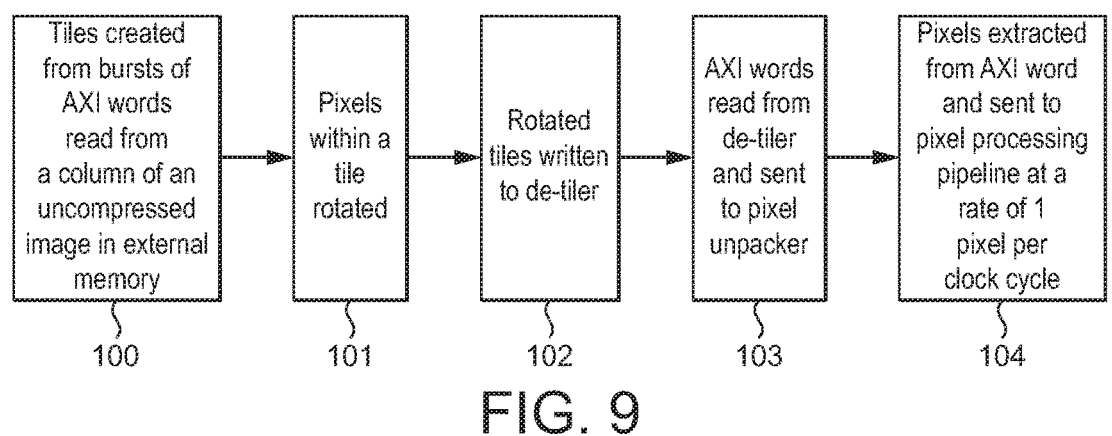
FIG. 9 shows schematically the operation of a display controller in accordance with an embodiment of the technology described herein.

FIG. 9 shows schematically the operation of the display controller 4 when fetching uncompressed data, rotating the data and converting it into raster line data in accordance with the present embodiment.

As shown in FIG. 9, blocks (tiles) created from bursts of (AXI) words are read from a column of an uncompressed surface in external memory 8 (step 100). The pixel data within the block (tile) is rotated as desired by the rotation stage 12 (step 101). Rotated blocks are then written to the de-tiler buffer 21 (step 102). Data words (AXI words) are read from the de-tiler buffer 21 and sent to the pixel unpacker 23 (step 103). Pixels are extracted from the (AXI) words and sent to the pixel processing pipeline 16 at a rate of one pixel per clock cycle (step 104).

It can be seen from the above that embodiments of the technology described herein enable reduction of power consumption within a data processing system, e.g. where block (tile) data is converted to line data by writing the block data to a memory and then reading the data in the form of lines from the memory. This is achieved, in embodiments at least, by storing blocks of data of a second row of blocks of data in the memory at memory addresses that fall between memory addresses at which blocks of data of a first row of blocks of data are stored in a sequence of memory addresses for the memory.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system comprising:
    producing data in the form of blocks of data, where each block of data represents a particular region of an output data array;
    storing the data in a memory of the data processing system; and
    reading the data from the memory in the form of lines;
    wherein storing the data in the memory comprises:
    storing each block of data of a first row of blocks of data in the memory at one or more memory addresses of a first set of memory addresses of a sequence of memory addresses for the memory; and
    storing each block of data of a second row of blocks of data in the memory at one or more memory addresses of a second set of different memory addresses of the sequence of memory addresses for the memory;
    wherein at least some of the memory addresses of the second set of memory addresses fall between memory addresses of the first set of memory addresses in the sequence of memory addresses for the memory; and
    wherein the method comprises:
    when the size of each row of blocks of data is less than or equal to half the size of the memory: storing each block of data of the first row of blocks of data in the memory at one or more memory addresses of the first set of memory addresses of the sequence of memory addresses for the memory, and storing each block of data of the second row of blocks of data in the memory at one or more memory addresses of the second set of different memory addresses of the sequence of memory addresses for the memory; but
    when the size of each row of blocks of data is greater than half of the size of the memory: storing each block of data of a single row of blocks of data in the memory.

2. The method of claim 1, wherein the memory has a size that is sufficient to store only one row of blocks of data of a maximum output data array size that the data processing system is configured to produce.

3. The method of claim 1, further comprising selecting a number of rows of blocks of data to store together in the memory depending on the size of output data array.

4. The method of claim 1, wherein the sequence of memory addresses corresponds at least in part to a read sequence of memory addresses for reading data from the memory in the form of lines.

5. The method of claim 1, wherein for each row of blocks of data, adjacent blocks of data of the row are stored at memory addresses that are separated in the sequence of memory addresses.

6. The method of claim 1, wherein reading the data from the memory in the form of lines comprises reading data from plural sets of contiguous memory addresses, wherein each contiguous set of memory addresses is separated by a particular number of memory addresses.

7. The method of claim 6, wherein the particular number of memory addresses depends on the number of rows of blocks of data that are stored in the memory.

8. A method of operating a data processing system comprising:
producing data in the form of blocks of data, where each block of data represents a particular region of an output data array;
storing the data in a memory of the data processing system; and
reading the data from the memory in the form of lines;
wherein reading the data from the memory in the form of lines comprises reading data from plural contiguous sets of memory addresses for the memory; and
wherein the plural contiguous sets of memory addresses are each separated by a particular number of memory addresses that depends on the size of the output data array; and
wherein the method comprises:
when the size of each row of blocks of data of the output data array is less than or equal to half the size of the memory: reading a first row of blocks of data and reading a second row of blocks of data from the memory in the form of lines by reading data from plural contiguous sets of memory addresses for the memory, wherein the plural contiguous sets of memory addresses are each separated by a first number of memory addresses; but
when the size of each row of blocks of data of the output data array is greater than half of the size of the memory: reading a single row of blocks of data from the memory in the form of lines by reading data from plural contiguous sets of memory addresses for the memory, wherein the plural contiguous sets of memory addresses are each separated by a second different number of memory addresses.

9. The method of claim 1, further comprising causing at least some of the data and/or a processed version of at least some of the data to be displayed.

10. A data processing system comprising:
first processing stage circuitry operable to produce data in the form of plural blocks of data, where each block of data represents a particular region of an output data array;
second processing stage circuitry operable to read the data from the memory in the form of lines; and
a memory;
wherein the data processing system is operable to store the data in the memory by:
storing each block of data of a first row of blocks of data in the memory one or more memory addresses of a first set of memory addresses of a sequence of memory addresses for the memory; and
storing each block of data of a second row of blocks of data in the memory at one or more memory addresses of a second set of different memory addresses of the sequence of memory addresses for the memory;
wherein at least some of the memory addresses of the second set of memory addresses fall between memory addresses of the first set of memory addresses in the sequence of memory addresses for the memory; and
wherein the data processing system is operable to store the data in the memory by:
when the size of each row of data blocks is less than or equal to half the size of the memory: storing each block of data of the first row of blocks of data in the memory at one or more memory addresses of the first set of memory addresses of the sequence of memory addresses for the memory, and storing each block of data of the second row of blocks of data in the memory at one or more memory addresses of the second set of different memory addresses of the sequence of memory addresses for the memory; but
when the size of each row of data blocks is greater than half of the size of the memory: storing each block of data of a single row of blocks of data in the memory.

11. The data processing system of claim 10, wherein the memory has a size that is sufficient to store only one row of blocks of data of a maximum output data array size that the data processing system is configured to produce.

12. The data processing system of claim 10, wherein the data processing system is operable to select a number of rows of blocks of data to store together in the memory depending on the size of the output data array.

13. The data processing system of claim 10, wherein the sequence of memory addresses corresponds at least in part to a read sequence of memory addresses for reading data from the memory in the form of lines.

14. The data processing system of claim 10, wherein the data processing system is operable to store adjacent blocks of data of each row at memory addresses that are separated in the sequence of memory addresses.

15. The data processing system of claim 10, wherein the data processing system is operable to read the data from the memory in the form of lines by reading data from plural sets of contiguous memory addresses, wherein each contiguous set of memory addresses is separated by a particular number of memory addresses.

16. The data processing system of claim 15, wherein the particular number of memory addresses depends on the number of rows of blocks of data that are stored in the memory.

17. The data processing system of claim 10, wherein the data processing system is operable to cause at least some of the data and/or a processed version of at least some of the data to be displayed.

18. A data processing system comprising:
first processing stage circuitry operable to produce data in the form of blocks of data, where each block of data represents a particular region of an output data array;
second processing stage circuitry operable to read the data from the memory in the form of lines; and
a memory;
wherein the data processing system is configured to read the data from the memory in the form of lines by reading data from plural contiguous sets of memory addresses for the memory; and
wherein the plural contiguous sets of memory addresses are each separated by a particular number of memory addresses that depends on the size of the output data array;
wherein the data processing system is configured to:
when the size of each row of blocks of data of the output data array is less than or equal to half the size of the memory: read a first row of blocks of data and read a second row of blocks of data from the memory in the form of lines by reading data from plural contiguous sets of memory addresses for the memory, wherein the plural contiguous sets of memory addresses are each separated by a first number of memory addresses; but when the size of each row of blocks of data of the output data array is greater than half of the size of the memory: read a single row of blocks of data from the memory in the form of lines by reading data from plural contiguous sets of memory addresses for the memory, wherein the plural contiguous sets of memory addresses are each separated by a second different number of memory addresses.

19. A non-transitory computer readable storage medium storing computer software code which when executing on a processor performs a method of operating a data processing system comprising:

producing data in the form of blocks of data, where each block of data represents a particular region of an output data array;

storing the data in a memory of the data processing system; and reading the data from the memory in the form of lines; wherein storing the data in the memory comprises:

storing each block of data of a first row of blocks of data in the memory at one or more memory addresses of a first set of memory addresses of a sequence of memory addresses for the memory; and storing each block of data of a second row of blocks of data in the memory at one or more memory addresses of a second set of different memory addresses of the sequence of memory addresses for the memory;

wherein at least some of the memory addresses of the second set of memory addresses fall between memory addresses of the first set of memory addresses in the sequence of memory addresses for the memory; and wherein the method comprises:

when the size of each row of blocks of data is less than or equal to half the size of the memory: storing each block of data of the first row of blocks of data in the memory at one or more memory addresses of the first set of memory addresses of the sequence of memory addresses for the memory, and storing each block of data of the second row of blocks of data in the memory at one or more memory addresses of the second set of different memory addresses of the sequence of memory addresses for the memory; but when the size of each row of blocks of data is greater than half of the size of the memory: storing each block of data of a single row of blocks of data in the memory.

* * * * *